(12) United States Patent
Jones et al.

(10) Patent No.: US 11,426,972 B2
(45) Date of Patent: Aug. 30, 2022

(54) CROSS-PLANE DRAINAGE FABRIC

(71) Applicant: Nicolon Corporation, Pendergrass, GA (US)

(72) Inventors: David Michael Jones, Buford, GA (US); Kevin Nelson King, Demorest, GA (US)

(73) Assignee: NICOLON CORPORATION, Pendergrass, GA (US)

( * ) Notice: Subject to any disclaimer, the term of this patent is extended or adjusted under 35 U.S.C. 154(b) by 479 days.

(21) Appl. No.: 16/432,440

(22) Filed: Jun. 5, 2019

(65) Prior Publication Data

US 2019/0366678 A1  Dec. 5, 2019

Related U.S. Application Data

(60) Provisional application No. 62/680,774, filed on Jun. 5, 2018.

(51) Int. Cl.
| | | |
|---|---|---|
| *B32B 5/26* | (2006.01) | |
| *E02D 17/20* | (2006.01) | |
| *D03D 15/283* | (2021.01) | |

(52) U.S. Cl.
CPC ............ *B32B 5/26* (2013.01); *D03D 15/283* (2021.01); *E02D 17/20* (2013.01); *D10B 2505/204* (2013.01); *E02D 2300/0087* (2013.01)

(58) Field of Classification Search
CPC .......... B32B 5/26; D03D 15/00; E02D 17/20; E02D 2300/0087; D10B 2505/204; D10B 2401/02
USPC ................................. 442/204, 213, 214, 216
See application file for complete search history.

(56) References Cited

U.S. PATENT DOCUMENTS

| | | | |
|---|---|---|---|
| 4,992,003 A | * | 2/1991 | Perach ...................... E02D 3/00 405/284 |
| 5,200,248 A | | 4/1993 | Thompson et al. |
| 5,232,759 A | * | 8/1993 | Golze .................... E02B 3/125 428/89 |
| 5,268,229 A | | 12/1993 | Phillips |
| 5,611,981 A | | 3/1997 | Phillips et al. |
| 5,651,641 A | | 7/1997 | Stephens et al. |
| 5,977,429 A | | 11/1999 | Phillips et al. |
| 9,404,233 B2 | | 8/2016 | Jones et al. |

(Continued)

FOREIGN PATENT DOCUMENTS

| | | |
|---|---|---|
| CN | 106958175 A | 7/2017 |
| CN | 213142343 U | 5/2021 |

(Continued)

OTHER PUBLICATIONS

Van Genuchten, "A Closed-Form Equation for Predicting the Hydraulic Conductivity of Unsaturated Soils," Soil Science Society of America Journal, 44 (5), pp. 892-898.

(Continued)

*Primary Examiner* — Elizabeth C Imani
(74) *Attorney, Agent, or Firm* — Cantor Colburn LLP

(57) ABSTRACT

Described herein is an anti-capillary barrier geotextile which includes a wicking yarn in its structure and has a volumetric moisture content at breakthrough of less than 0.30 as determined by the TenCate Test. In one aspect the anti-capillary barrier geotextile is a single-layer woven geotextile and includes a wicking yarn set and, optionally, a first non-wicking yarn disposed in one axis of the geotextile; and a second non-wicking yarn disposed in another axis of the geotextile and interweaving the wicking yarn set and optional first non-wicking yarn.

53 Claims, 21 Drawing Sheets

(56) References Cited

U.S. PATENT DOCUMENTS

| | | |
|---|---|---|
| 2009/0245936 A1 | 10/2009 | Jones et al. |
| 2010/0248574 A1 | 9/2010 | King et al. |
| 2011/0250448 A1 | 10/2011 | Jones et al. |
| 2015/0159305 A1 | 6/2015 | Booth |
| 2017/0172074 A1 | 6/2017 | Toye |
| 2017/0233970 A1 | 8/2017 | Booth et al. |
| 2018/0010317 A1 | 1/2018 | Walker |

FOREIGN PATENT DOCUMENTS

| | | |
|---|---|---|
| WO | 2011130287 A1 | 10/2011 |
| WO | 2013036848 A1 | 3/2013 |
| WO | 2014013083 A1 | 1/2014 |
| WO | 2017007144 A1 | 1/2017 |
| WO | 2017177087 A1 | 10/2017 |

OTHER PUBLICATIONS

Azevedo, M., "Anti-Capillary Barrier Performance of Wicking Geotextiles", The University of Texas at Austin. Aug. 2012. [Retrieved Jul. 28, 2019], Retrieved from the internet: URL: https://repositories.lib.utexas.edu/bitstream/handle/2152/ETD-UT-2012-08-6302/AZEVEDO-THESIS.pdf?sequence=1&isAllowed=y> entire document.

Azevedo, M., "Performance of Geotextiles with Enhanced Drainage", The University of Texas at Austin. Dec. 2016. [Retrieved Jul. 28, 2019], Retrieved from the internet: <URL: https://repositories.lib.utexas.edu/bitstream/handle/2152/72484/AZEVEDO-DISSERTATION-2016.pdf?sequence=1&isAllowed=y> entire document.

Notification of Transmittal of the International Search Report and the Written Opinion of the International Searching Authority, or the Declaration PCT/US2019/035583 dated Aug. 27, 2019.

Colombia Office Action dated May 10, 2022, with English translation. (16 pages).

Extended European Search Report dated Apr. 4, 2022 in Application No. 19815148.2 (12 pages).

India Intellectual Property, First Examination Report dated Jul. 4, 2022; Application No. 202037053256 (6 pages).

China Office Action dated Jul. 7, 2022; Application No. 201980038584.2, 6 pages.

\* cited by examiner

CROSS-PLANE DRAINAGE FABRIC

CROSS-REFERENCE TO RELATED APPLICATION

This application claims benefit of U.S. Provisional Patent Application No. 62/680,774 filed Jun. 5, 2018, which is incorporated herein in its entirety by reference.

TECHNICAL FIELD

The instant invention generally is related to geosynthetic fabrics. More specifically, the instant invention is related to woven and nonwoven fabrics providing cross-plane drainage through unsaturated soil.

BACKGROUND OF THE INVENTION

Geotextiles, also referred to geosynthetic fabrics, are used in a wide range of civil engineering systems to provide benefits of separation, reinforcement, filtration, drainage, infiltration barriers, protection, and erosion control. Typical civil structure applications involve waste containment facilities, pavements, and earth retaining structures, to name only a few. Moisture buildup beneath the civil structures can destabilize its base and cause various problems.

Geotextiles can be used to separate two layers of soil with dissimilar particle size distributions. For example, geotextiles are utilized in road construction to prevent base gravel from penetrating the soil subgrade to maintain the design thickness for the road base. In addition, the filtration function of a geotextile permits moisture flow between the drainable gravel base and the soil subgrade without fine migration into the larger pores of the gravel which would limit its drainage capabilities.

Cross-plane flow corresponds to flow through a geosynthetic fabric in a direction perpendicular to its plane, which is identified as the fabric's permittivity. Typically, conventional geosynthetic fabrics drain moisture from soils only under saturated conditions. Under saturated conditions, moisture reaches the plane of a geosynthetic fabric, penetrates through the fabric, and flows across the plane of the fabric and maintains base stabilization. However, under unsaturated conditions, capillary barriers develop and instigate undesirable moisture buildup at the interface between materials with contrasting hydraulic conductivity (e.g., a geosynthetic fabric overlain by a fine-grained soil). Thus, the capillary barrier prevents moisture penetration through the geosynthetic and undermines some of the benefits of the geotextile.

Geotextiles have average opening sizes (AOS) similar to that of a coarse-grained soil. When two unsaturated porous materials with different hydraulic conductivities are in contact with one another, e.g. a fine-grained soil overlying a geotextile, capillary barriers form which increase the moisture storage of the overlying soil. Moisture accumulation will continue in the fine-grained soil until sufficient energy is developed so that the hydraulic conductivity of the fine-grained soil exceeds the hydraulic conductivity of the geotextile, thereby causing breakthrough and finally allowing flow into the geotextile openings. However, moisture storage will not increase past the saturated moisture content of the soil. This excess moisture reduces soil strength and stability at the soil/geotextile interface.

Accordingly, there is a need for a geosynthetic fabric capable of providing cross-plane drainage in unsaturated soil conditions. Moreover, there is a need for a geosynthetic fabric that resists capillary barrier formation in unsaturated soils and facilitates moisture infiltration into the fabric and underlying soil. It is to solving these and other needs the present invention is directed.

SUMMARY OF THE INVENTION

Disclosed herein is an anti-capillary barrier geotextile comprising a wicking yarn and having a volumetric moisture content at breakthrough of less than 0.30 as determined by the TenCate Test. In another aspect, the anti-capillary barrier geotextile comprises a wicking yarn and has a moisture content of less than 0.3 and a Flow Delta of less than 490 mL as determined by the TenCate Test.

The anti-capillary barrier geotextile includes a single-layer woven geotextile and a composite geotextile. The single-layer woven geotextile comprises a wicking yarn set and, optionally, a first non-wicking yarn disposed in one axis of the geotextile; and a second non-wicking yarn disposed in another axis of the geotextile and interweaving the wicking yarn set and optional first non-wicking yarn; the wicking yarn set comprises one or more wicking yarns. A non-limiting example of a single-layer, woven ECPD geotextile in accordance with the invention described herein employs in the weave pattern a repeating disposition of the wicking yarn set and the first non-wicking yarn in one axis of the geotextile. In another aspect, the repeating weave pattern comprises the wicking yarn set, the first non-wicking yarn, and the wicking yarn set. The single-layer woven geotextile has a total surface area is between about 10 to about 50 $cm^2/g$. Further, single-layer woven geotextile has a permeability between about 0.05 to about 0.15 cm/s. The wicking yarns of the single-layer woven geotextile has a weight between about 0.5 and about 25 osy. The term "osy" means ounce per square yard. In another aspect the single-layer woven geotextile comprises between 5 and 50 wicking yarns per linear inch.

The wicking yarn is between about 500 and about 2500 denier. A non-limiting example of the wicking yarn comprises a bundle of wicking monofilaments. Wicking monofilaments can be, without limitation, multichannel, trilobal, pillow, or any combination thereof.

BRIEF DESCRIPTION OF THE DRAWINGS

The invention will be better understood and the above objects as well as objects other than those set forth above will become apparent when consideration is given to the following detailed description thereof. For a fuller understanding of this disclosure and the invention described therein, reference should be made to the above and following detailed description taken in connection with the accompanying figures. When reference is made to the figures, like reference numerals designate corresponding parts throughout the several figures. Such description makes reference to the annexed drawings wherein.

DETAILED DESCRIPTION OF THE INVENTION

Figure 1:
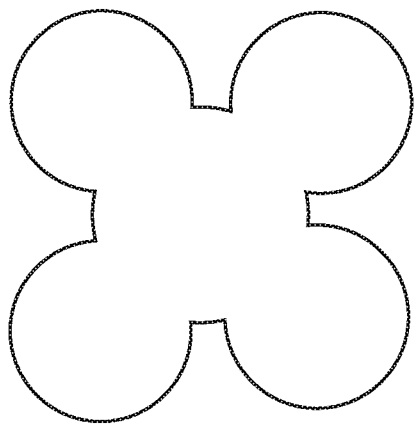
FIG. 1 is an illustration of wicking fiber cross-sections employed in the present invention.
Figure 1:
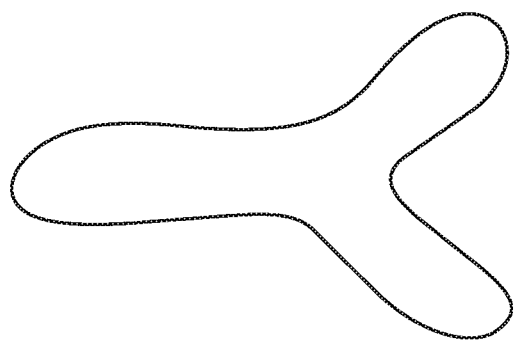
Figure 1:
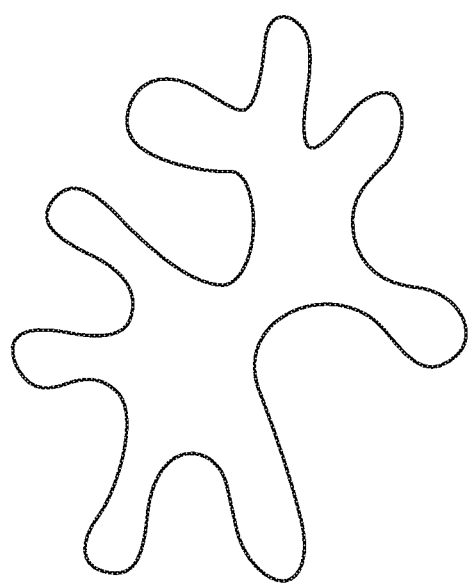

Geotextiles, particularly when employed in civil constructions, such as roads, embankments, walls, and the like, provide separation between two layers of soil with dissimilar particle size distributions. For example, geotextiles prevent base gravel from penetrating the soil subgrade to maintain the design thickness of the road base. Similarly, the filtration function of a geotextile will allow for adequate water flow between the drainable gravel base and the soil subgrade without fine migration into the larger pores of the gravel which would limit its drainage capabilities. Also, geotextiles can act as a protection layer by preventing gravel from puncturing geomembranes which are used as moisture barriers.

While geotextiles are flexible, the polymers that comprise them become rigid when the fabric is in tension. The tensile strength of a geotextile adds a reinforcement benefit to a soil structure by increasing its stiffness. For example, geotextile reinforcement of pavements significantly extends their design life by delaying cracks from propagating to the surface of the road. Such cracks allow the ingress of water into the pavement, which initiates the deterioration process.

Geotextiles are utilized for their drainage capability which provides a pathway for water flow parallel to the plane of the geotextile in saturated soil. This drainage function, for example, is used to dissipate pore water pressures at the base of an embankment or as shoulder drains for pavement.

During the design phase of the civil construction, it is generally assumed that once water reaches the geotextile, it will infiltrate the fabric and be removed from the soil. However, in the presence of unsaturated soils, a capillary barrier can form to resist water drainage, resulting in a buildup of water at the interface. This excess water reduces soil strength and stability at the soil/geotextile interface. Unsaturated conditions commonly prevail in pavement systems and various other civil structures.

Under unsaturated conditions, a capillary barrier can form to restrict water flow when two unsaturated porous materials with differing hydraulic conductivities are in contact with one another (e.g., a fine-grained soil overlying a coarse-grained soil). Due to the relatively large opening sizes of geotextiles, a geotextile acts similarly to a coarse-grained soil. Capillary barriers increase the water storage of the overlying soil by forming a temporary barrier at the interface of the two materials. A capillary barrier develops due to a difference in the hydraulic conductivity between the small pores of a fine-grained soil compared to the larger pores of a coarse-grained soil. This difference restricts water in the small pores from entering the larger pores. Until suction decreases in the fine-grained soil to the point that the hydraulic conductivity of the two adjacent soils are the same, water accumulation will continue in the fine-grained soil. When the suction has decreased enough to allow water to break into the larger pores, referred to as the breakthrough suction or breakthrough, water buildup will be halted and flow will proceed into the coarse-grained soil.

A woven fabric typically has two principle directions, one being the warp direction and the other being the weft direction. The weft direction is also referred to as the fill direction. The warp direction is the length wise, or machine direction of the fabric. The fill or weft direction is the direction across the fabric, from edge to edge, or the direction traversing the width of the weaving machine. Thus, the warp and fill directions are generally perpendicular to each other. The set of yarns, threads, monofilaments, films, and slit tapes running in each direction are referred to as the warp yarns and the fill yarns, respectively.

A woven fabric can be produced with varying densities. This is usually specified in terms of number of the ends per inch in each direction, warp and fill. The higher this value is, the more ends there are per inch and, thus, the fabric density is greater or higher.

The term "shed" is derived from the temporary separation between upper and lower warp yarns through which the fill yarns are woven during the weaving process. The shed allows the fill yarns to interlace into the warp to create the woven fabric. By separating some of the warp yarns from the others, a shuttle, projectile or the like can carry the fill yarns through the shed, for example, perpendicularly to the warp yarns. As known in weaving, the warp yarns which are raised and the warp yarns which are lowered respectively become the lowered warp yarns and the raised warp yarns after each pass of the weft yarn. During the weaving process, the shed is raised; the shuttle carries the weft yarns through the shed; the shed is closed; and the fill yarns are pressed into place, called the fell of the cloth. Accordingly, as used herein with respect to the woven fabric, the term "shed" means a respective fill set which is bracketed by warp yarns.

The weave pattern of fabric construction is the pattern in which the warp yarns are interlaced with the fill yarns. A woven fabric is characterized by an interlacing of these yarns. For example, plain weave is characterized by a repeating pattern where each warp yarn is woven over one fill yarn and then woven under the next fill yarn.

A plain multi-pick weave is characterized by a repeating pattern where a warp set of one or more warp yarns is woven over one fill set of two or more fill yarns and then woven under the next fill set. In other words, the plain multi-pick weave comprises fill sets having two or more fill yarns per shed. For example, a six-pick weave is characterized by a repeating pattern where a warp set of one or more warp yarns is woven over one fill set of six fill yarns and then woven under the next fill set. That is, the plain six-pick weave comprises fill sets having six fill yarns per shed. As used herein, a 1/2 plain weave is characterized by a repeating pattern where each warp yarn is woven over one fill set of two fill yarns and then woven under the next two-yarn fill set. 1/3, 1/4, and 1/5 plain weave respectively are characterized by a repeating patter where each warp yarn is woven over one fill set of three, four, or five fill yarns and then woven under the next fill set of like number of yarns. As used herein, a 1/6 plain weave is characterized by a repeating pattern where each warp yarn is woven over one fill set and then woven under the next fill set. The 1/6 plain weave is described in U.S. Pat. No. 9,404,233, which is incorporated herein by reference in its entirety.

A twill weave, in contrast to the plain weave and the plain multi-pick weave, has fewer interlacings in a given area. The twill is a basic type of weave, and there are a multitude of different twill weaves. A twill weave is named by the number of fill yarns which a single warp yarn goes over and then under. For example, in a 2/2 twill weave, a single warp end weaves over two fill yarns and then under two fill yarns. In a 3/1 twill weave, a single warp end weaves over three fill yarns and then under one fill yarn. For fabrics being constructed from the same type and size of yarn, with the same thread or monofilament densities, a twill weave has fewer interlacings per area than a corresponding plain weave fabric. Accordingly, a twill weave is not a plain multi-pick weave.

A satin weave, also in contrast to the plain weave and the plain multi-pick weave, has fewer interlacings in a given area. It is another basic type of weave from which a wide array of variations can be produced. A satin weave is named by the number of ends on which the weave pattern repeats. For example, a five harness satin weave repeats on five ends and a single warp yarn floats over four fill yarns and goes under one fill yarn. An eight harness satin weave repeats on eight ends and a single warp yarn floats over seven fill yarns and passes under one fill yarn. For fabrics being constructed from the same type of yarns with the same yarn densities, a satin weave has fewer interlacings than either a corresponding plain or twill weave fabric.

The process for making fabrics, to include geotextile fabrics, is well known in the art. Thus, the weaving process employed can be performed on any conventional textile handling equipment suitable for producing a woven geotextile fabric.

Described herein is an anti-capillary barrier geotextile, also referred to herein generally as an enhanced cross-plane drainage (ECPD) geotextile. The ECPD geotextile facilitates moisture infiltration for cross-plane enhanced drainage and substantially prevents capillary barrier formation in unsaturated soils at the soil/geotextile interface. The anti-capillary barrier geotextile does not cause or substantially minimizes moisture accumulation from a capillary barrier due to cross-plane flow. The ECPD geotextile comprises a wicking yarn. The term "wicking yarn" includes a wicking fiber, wicking monofilament, a bundle of wicking monofilaments, or any combination thereof. Further, the ECPD geotextile has a volumetric moisture content at breakthrough of less than 0.30 as determined in accordance with the TenCate Test. Alternatively, the ECPD geotextile has a volumetric moisture content at breakthrough of less than 0.30 and Flow Delta of less than 490 mL as determined in accordance with the TenCate Test. The TenCate Test is described and defined below in Example 1.

ECPD geotextiles include both a single-layer, woven geotextile and a composite geotextile, both of which comprising a wicking yarn. In one aspect the ECPD geotextile has a volumetric moisture content at breakthrough of less than 0.30. In another aspect the ECPD geotextile also has a Flow Delta of less than 490 mL. When reference is made to either volumetric moisture content at breakthrough or Flow Delta in this specification, the accompanying figures, and the claims, both parameters are determined in accordance with the TenCate Test. The TenCate Test is described and defined below in Example 1. Wicking yarns are employed within the construction of the ECPD geotextile. Wicking yarns facilitate drainage of water that otherwise would be stored within an adjacent unsaturated soil mass. Such geotextile can provide soil stabilization, resist capillary barrier formation, and facilitate water infiltration from the soil into the geotextile to provide cross-plane drainage.

A single-layer, woven ECPD geotextile has a volumetric moisture content at breakthrough of less than 0.30 and comprises a wicking yarn set and, optionally, a first non-wicking yarn disposed in one axis of the geotextile; and a second non-wicking yarn disposed in another axis of the geotextile and interweaving the wicking yarn set and optional first non-wicking yarn. The term "optionally" means that the first non-wicking yarn is not required, but nevertheless can be employed if desired and is encompassed within the scope of the claims. For example, the wicking yarn set can be disposed in the warp direction (one axis of the geotextile) with the second non-wicking yarn being disposed in the weft direction (another axis of the geotextile). Alternatively, the wicking yarn set can be disposed in the weft direction (one axis of the geotextile) with the second non-wicking yarn being disposed in the warp direction (another axis of the geotextile). Although not required, wicking yarns can be disposed in the same axis of the second non-wicking yarn. In one aspect the wicking yarn set comprises two wicking yarns. In another aspect the wicking yarn set comprises three wicking yarns. Still, in another aspect, the wicking yarn set comprises four, five, or six wicking yarns. A non-limiting example of a single-layer, woven ECPD geotextile in accordance with the invention described herein has a repeating weave pattern comprising the wicking yarn set, the first non-wicking yarn, and the wicking yarn set in one axis of the geotextile. Another non-limiting example of a single-layer, woven ECPD geotextile in accordance with the invention described herein has a repeating weave pattern comprising a first wicking yarn set, a second wicking yarn set, and the first non-wicking yarn in one axis of the geotextile. It will be apparent to one of ordinary skill in the art that various repeating patterns of wicking yarn in combination with non-wicking yarn can be employed in invention described herein.

The ECPD geotextile has a moisture content at breakthrough of less than 0.30. In another aspect, the ECPD geotextile has a moisture content a breakthrough of less than 0.29, 0.28, 0.27, 0.26, 0.25, 0.24, 0.23, 0.22, 0.21, or 0.20.

Further, the ECPD geotextile has a Flow Delta of less than 490 mL. In another aspect, the ECPD geotextile has a Flow Delta of less than 480 mL, 470 mL, 460 mL, 450 mL, 440 mL, 430 mL, 420 mL, 410 mL, 400 mL, 390 mL, 380 mL, 370 mL, 360 mL, 350 mL, 340 mL, 330 mL, 320 mL, 310 mL, 300 mL, 290 mL, 280 mL, 270 mL, 260 mL, 250 mL, 240 mL, 230 mL, 220 mL, 210 mL, 200 mL, 190 mL, 180 mL, 170 mL, 160 mL, 150 mL, 140 mL, 130 mL, 120 mL, 110 mL, or 100 mL.

A wicking yarn set comprises one or more wicking yarns. A wicking yarn is between about 500 and about 2500 denier and comprises a bundle of wicking monofilaments. A bundle of wicking monofilaments has between about 50 to about 1,000 wicking monofilaments. An example of a bundle of wicking monofilaments which can be employed in the single-layer, woven ECPD geotextile is a twisted bundle of wicking monofilaments. Non-limiting examples of wicking monofilaments include, but are not limited to, multichannel, trilobal, pillow, or any combination thereof. Multichannel wicking monofilaments are also referred to herein as 4DG monofilaments.

The wicking monofilaments employed in the single-layer woven ECPD geotextile have a respective denier of between about 1 and about 170. However, wicking monofilaments which can be employed in the ECPD geotextile can be greater than 170 denier. For example, the wicking monofilaments can have a respective denier of between about 30 and about 170. In another example, the wicking monofilaments can have a respective denier of between about 1 and about 100. In yet another example, the wicking monofilaments have a respective denier of between about 3 and about 7.

The weight of the wicking yarns contained in the weave of the single-layer ECPD geotextile is between about 0.5 ounces per square yard (osy) and about 25 osy. In one example, the weight of the wicking yarns contained in the weave of the single-layer ECPD geotextile is about 1.1 osy. Further, the single-layer woven ECPD geotextile comprises between 5 and 50 wicking yarns per linear inch. For example, the single-layer woven ECPD geotextile comprises 10 wicking yarns per linear inch.

The single-layer woven ECPD geotextile has a total surface area between about 10 cm$^2$/g to about 50 cm$^2$/g. Also, the single-layer woven ECPD geotextile has a permeability between about 0.05 cm/s to about 0.15 cm/s.

The single-layer woven ECPD geotextile has a density in the axis containing the wicking yarn set is between about 5 and about 50 yarns per linear inch. Additionally, the single-layer woven ECPD geotextile has a density in the axis containing the second non-wicking yarn is between about 5 and about 75 yarns per linear inch.

Various weave patterns can be utilized to form the single-layer woven ECPD geotextile. Such weave patterns include, but are not limited to, plain, plain multi-pick, twill, and satin. For example the single-layer woven ECPD geotextile can be a plain weave. Another example of the single-layer woven ECPD geotextile can be a satin weave. A non-limiting example of a single-layer, woven ECPD geotextile in accordance with the invention described herein employs in the weave pattern a repeating disposition of the wicking yarn set and the first non-wicking yarn in one axis of the geotextile. Another non-limiting example of a single-layer, woven ECPD geotextile in accordance with the invention described herein employs in the weave pattern a repeating disposition of a first wicking yarn set, a second wicking yarn set, and the first non-wicking yarn in one axis of the geotextile, wherein the first and second wicking yarns sets are the same or different. It will be apparent to one of ordinary skill in the art that various repeating dispositions of wicking yarn in combination with non-wicking yarn can be employed in invention described herein.

First and second non-wicking yarns can be the same or different. The first and second non-wicking yarns, independently, can be a monofilament, yarn, tape, or any combination thereof. For example the first non-wicking yarn can employ either monofilaments, yarns, tapes, or any combination thereof in the weave. Similarly, the second non-wicking yarn can be monofilaments, yarns, tapes, or any combination thereof in the weave. Moreover, the first and second non-wicking yarns can be the same or different, thereby providing the manufacture multiple design options with respect to the non-wicking yarns. The non-wicking yarns, independently, are between about 100 and about 10,000 denier.

As stated above, ECPD geotextiles include a composite geotextile. Referring to FIGS. 2-5, the composite geotextile 10 comprises a drainage layer 20 and a wicking layer 30 extending outwardly from the drainage layer 20. The wicking layer 30 comprises wicking yarns 35. Wicking yarns can be disposed in the drainage layer, but are not required.

"Cross-plane drainage" means liquid flow through a geotextile fabric in a direction perpendicular to its plane.

"Fiber" means a material in which the length to diameter ratio is greater than about 10. Fiber is typically classified according to its diameter. Filament fiber is generally defined as having an individual fiber diameter greater than about 15 denier, usually greater than about 30 denier per filament. Fine denier fiber generally refers to a fiber having a diameter less than about 15 Denier per filament. Microdenier fiber is generally defined as fiber having a diameter less than about 100 microns denier per filament.

"Filament fiber" or "monofilament fiber" means a continuous strand of material of indefinite (i.e., not predetermined) length, as opposed to a "staple fiber".

"Staple fiber" is a discontinuous strand of material of definite length (i.e., a strand which has been cut or otherwise divided into segments of a predetermined length). Staple fibers can be made into non-woven webs and fabrics using any methods currently used or hereafter discovered, including spunlacing, needle-punching, thermal bonding, and card-and-bind processing.

"Nonwoven" means a web or fabric having a structure of individual fibers or threads which are randomly interlaid, but not in an identifiable manner as is the case of a knitted or woven fabric.

"Knitted fabric" means a fabric formed of interlaced loops.

"Yarn" means a continuous length of twisted or otherwise entangled plurality of filaments (i.e., multifilament) which can be used in the manufacture of woven or knitted fabrics and other articles.

Fibers and yarns can be made into fabrics using any methods currently used or hereafter discovered for making fibers and yarns into fabrics, including but not limited to weaving and knitting.

Wicking Fibers

Wicking fibers are capable of transporting a liquid, such as water, substantially along a single axis. Such fibers typically have a high surface factor of less than 1.5 as compared to a round cross-sectional fiber of the same denier having a high surface factor of 1.0. Such wicking fibers generate increased capillary action over round cross-sectional fibers of the same denier. Several types of fibers can be employed in the present invention and are described below.

U.S. Pat. No. 5,200,248, which is incorporated herein by reference in its entirety, describes capillary channel polymeric fibers that can be employed in the present invention. Such fibers store and transport liquid and have non-round, cross-section shapes which include relatively long thin portions. The cross-section shapes are substantially the same along the length of the fiber. Further, these capillary channel fibers can be coated with materials that provide an adhesion tension with water of at least 25 dynes/cm.

U.S. Pat. No. 5,268,229, which is incorporated herein by reference in its entirety, describes fibers that can be employed in the present invention. These fibers have non-round cross-sectional shapes, specifically "u" and "E" shaped cross-sections with stabilizing legs. Further, these fibers are spontaneously wettable fibers and have cross-sections that are substantially the same along the length of the fiber.

U.S. Pat. No. 5,977,429, which is incorporated herein by reference in its entirety, describes fibers having distorted "H" shape, a distorted "Y" shape, a distorted "+" shape, a distorted "U" shape, and a distorted shape of a spun fiber that is referred to as "4DG". Such fibers can be employed in the present invention.

The capillary channel structures of the wicking fibers have an axial base and at least two walls extending from the base, whereby the base and walls define at least one capillary channel. Certain of such fibers have at least five walls and at least four capillary channels. Others can have at least six walls and at least five capillary channels. There is no theoretical maximum number of capillary channels that the structure hereof can have, such maximum number of capillary channels being governed more by need for such structures and practicability of making them. In one aspect of the present invention, the capillary channels are substantially parallel with one another and an open cross-section along at least about 20% of their length, along at least about 50% of their length or and along from at least 90% to 100% of their length.

Wicking fibers of the present invention provide flexible, collapse-resistant, capillary channel structures comprising a polymer composition and having at least one intrastructure capillary channel, wherein the structures have an axial base and at least two walls extending from the base, typically (but not necessarily) along substantially the entire length of the base element, whereby the base element and walls define said capillary channel(s). In general, the walls should extend from the base for a distance in the axial direction of the base for at least about 0.2 cm. In another aspect of the present invention, the walls extend from the base for a distance in the axial direction of the base for at least about 1.0 cm. The actual length of the structure is limited only by practical concerns. Although the capillary channel structures hereof can have one capillary channel or a plurality of capillary channels, for convenience the plural form "channels" is used with the intent that it shall refer to a singular "channel" in structures having only one such channel or a plurality of channels in structures having more than one channel. The structures are further characterized in that the capillary channels are open along a substantial length such that fluid can be received from outside of the channel as a result of such open construction. In general, the structures will typically have Specific Capillary Volume (SCV) of at least about 2.0 cc/g, at least about 2.5 cc/g or at least about 4.0 cc/g, and a Specific Capillary Surface Area (SCSA) of at least about 2000 $cm^2$ g, at least about 3000 $cm^2/g$ or at least about 4000 $cm^2/g$. The procedures to be used for measuring SCV and SCSA are provided in at least one of the patents listed above.

Typically, wicking fibers employed in the present invention have a surface composition that is hydrophilic, which may be inherent due the nature of the material used to make the fibers or may be fabricated by application of surface finishes. Hydrophilic surface finishes provide structures the surfaces of which have large adhesion tension (i.e., that strongly attract) with aqueous liquids and are therefore preferred for applications involving aqueous liquids such as those discussed below for temporary acquisition/distribution structures and permanent storage structures. In one aspect, the hydrophilic surface has an adhesion tension with distilled water greater than 25 dynes/cm as measured on a flat surface having the same composition and finish as the surface of the fiber. Some of the finishes/lubricants useful to provide large adhesion tensions to aqueous liquids are described or referenced in U.S. Pat. No. 5,611,981, which is incorporated by reference herein in its entirety. Surface finishes are well-known in the art.

As discussed above, the wicking fibers have channels on their surface which may be useful in distributing or storing liquids when the proper surface energetics exist on the surface of the fibers, such as when the fibers satisfy the above equation relating to specific surface forces. The surface energetics determine the adhesion tension between the surface and whatever liquid is in contact with the surface. The larger the adhesion tension, the stronger the force of attraction between the liquid and the surface. The adhesion tension is one factor in the capillary forces acting on the liquid in a channel. Another factor affecting the capillary forces acting on a liquid in a channel is the length of the perimeter of the channel. When the widths of the channels are small, the capillary forces are relatively strong compared to the force of gravity on the liquid, since the force of gravity on the liquid in a channel is proportional to the area of the channel.

FIG. 1 illustrates wicking fiber cross-sections of multi-channel, trilobal, and pillow that can be employed in the present invention. However, as indicated above, other shapes can be employed in the present invention. The multichannel is also referred to as the "4DG" shape.

Polymers

Wicking and non-wicking fibers employed in the present invention are made from the major melt spinnable groups. These groups include, without limitation, polyesters, nylons, polyolefins, and cellulose esters. Fibers from poly(ethylene terephthalate), polypropylene, and polypropylene/polypropylene copolymer admixtures are useful in the present invention at least because of their manufacturability and wide range of applications. A non-limiting example of the polymer employed in the wicking yarn is nylon. The denier of each fiber is between about 15 and about 250, or between about 30 and about 170.

In addition, wicking and non-wicking fibers can be formed from other polymers that shrink significantly when heated, such as polystyrene or foamed polystyrene. The step of shrinking introduces the distortion in the fiber that increases long-range distortion factor (LRDF) and short range distortion factor (SRDF). The relatively large values of LRDF and/or SRDF of the fibers described in U.S. Pat. No. 5,977,429, which is incorporated herein by reference in its entirety, provide their utility in absorbent products. Shrinking occurs for oriented amorphous polymeric fibers when the fibers are heated above their glass transition temperature. The shrinking occurs either prior to or in the absence of substantial crystallization.

As indicated above, the wicking and non-wicking fibers of the present invention can be made of any polymeric material that is insoluble in the liquid which is to be contacted with the capillary channel structures. Examples of suitable polymeric materials, in addition to polyester, polystyrene and polyolefins such as polyethylene and polypropylene, include, but are not limited to, polyamides, chemical cellulose-based polymers such as viscose and di- or tri-ace-, Co-, ter-, etc. polymers and grafted polymers. Thermoplastic polymers, such as polyesters and copolymers of dicarboxylic acids or esters thereof and glycols, can be employed in the present invention. The dicarboxylic acid and ester compounds used in the production of polyester copolymers are well known to those of ordinary skill in the art. They include terephthalic acid, isophthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkylesters thereof that contain from 1 to about 5 carbon atoms in the alkyl groups thereof.

Aliphatic glycols useful for the production of polyesters and copolyesters are the acrylic and alicyclic aliphatic glycols having from 2 to 10 carbon atoms, such as ethylene glycol, trimethylene glycol, tetramethylene glycol, pentamethylene glycol, and decamethylene glycol.

It is additionally contemplated to utilize copolymers or graft copolymers, terpolymers, chemically modified polymers, and the like, which permanently exhibit high surface hydrophilicity and do not require the use of wetting agents, which may wash away from the structure surface upon contact with fluids. Modified polymers which can exhibit permanent hydrophilicity include chemical cellulose polymers such as cellulose acetates. In addition, one can also include pigments, delusterants or optical brighteners by the known procedures and in the known amounts.

A type of polyester which can be employed in the present invention is glycol modified poly(ethylene terephthalnelate) (PETG) copolyester. Suitable PETG is available from Eastman Chemical Products, Inc. (Kingsport, Tenn., USA), under the name KODAR® 6763, with a glass transition temperature of about 81° C.

As indicated above polymers which can be employed to form the non-wicking and wicking yarns also include polypropylene/polypropylene copolymer admixtures. An example of such an admixture is an admixture of polypropylene and a polypropylene/ethylene copolymer. The admixture can comprise a polypropylene composition comprising a melt blended admixture of about 94 to about 95% by weight of polypropylene and about 5 to about 6% by weight of a polypropylene/ethylene copolymer. In another aspect, the yarn, monofilament, or tape can comprise an admixture of about 92% to about 95% by weight of polypropylene and about 5% to about 8% by weight of a polypropylene/ethylene copolymer. Further, in one aspect the polypropylene/ethylene copolymer has an ethylene content of about 5% to about 20% by weight of copolymer. In another aspect the polypropylene/ethylene copolymer has an ethylene content of about 8% to about 25%. Also, in another aspect, aspect the polypropylene/ethylene copolymer has an ethylene content of about 5% to about 17% by weight of copolymer. In yet another aspect, aspect the polypropylene/ethylene copolymer has an ethylene content of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25%, or any range therebetween, by weight of copolymer. Still, in another aspect, the polypropylene/ethylene copolymer has an ethylene content of about 16% by weight of copolymer. Such admixture yarn is referred to herein as "high modulus" or "high mod" yarn and is described in U.S. Patent Application Publication No. 2011/0250448, which is incorporated herein by reference in its entirety.

Another factor affecting polymer choice is amenability to chemical modification of its surface for increasing, for example, hydrophilicity. Thus, for capillary channel structures intended for absorbing and/or transporting aqueous based solutions, it can be advantageous to use a polyester-based polymer rather than, for example, a polypropylene. However, this selection option is not meant to thereby limit the scope of the invention. Also, depending upon the intended use of the structures, it can be desirable that the polymer material utilized be flexible at the temperatures at which the structures are intended to be used. Due to the relatively thin walls and bases of the structures hereof, even relatively high modulus polymers can be used to make structures that are both flexible and soft, yet which retain surprisingly high resistance to collapse. Flexibility will depend upon such factors as the thickness and dimensions of the capillary channel walls and base, as well as the modulus of elasticity. Thus, choice of polymer in this regard will be highly subject to the intended use and temperature conditions. Choice of such suitable polymer material is well within the ability of one of ordinary skill in the art. Depending upon the intended use, the capillary channel structures can be made, for example, from polymers that are either hydrophilic or oleophilic, or can be treated to be hydrophilic or oleophilic. The surface hydrophilicity of polymers used to make the capillary channel structures of the present invention can be increased to make the capillary channel walls more wettable to water or aqueous solutions by treatment with surfactants or other hydrophilic compounds (hereafter, collectively referred to as "hydrophilizing agents") known to those skilled in the art. Hydrophilizing agents include wetting agents such as polyethylene glycol monolaurates (e.g., PEGOSPERSE™ 200 ML, a polyethylene glycol 200 monolaurate available from Lonza, Inc., Williamsport, Pa., USA), and ethoxylated oleyl alcohols (e.g., VOLPO™-3, available from Croda, Inc., New York, N.Y., USA). Other types of hydrophilizing agents and techniques can also be used, including those well known to those skilled in the fiber and textile arts for increasing wicking performance, improving soil release properties, etc. These include, for example, surface grafting of polyacrylic acid. Suitable commercially available hydrophilizing agents include ZELCON™ soil release agent, a nonionic hydrophile available from DuPont Co., Wilmington, Del. (USA) and Milease T™, comfort finish available from ICI Americas, Inc., Wilmington, Del., USA. In addition, ERGASURF, ceramic microbeads and vinyl pyrrolidone can be employed as hydrophilic or hygroscopic additives. Further, certain combinations of hydrophilizing agents can be employed. One example is a combination of ALBAFLOW PAP-01, DICRYLAN PSF, AND INVADINE PBN. Another example is a combination of ULTRAPHIL TG AND INVADINE PBN.

Composite Fabric

Figure 2:
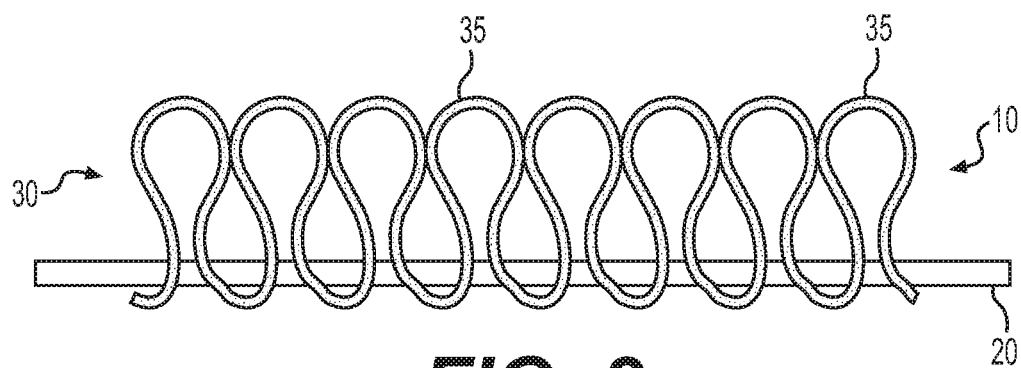
FIG. 2 is an illustration of a composite ECPD geotextile in accordance with the present invention.
Figure 3:
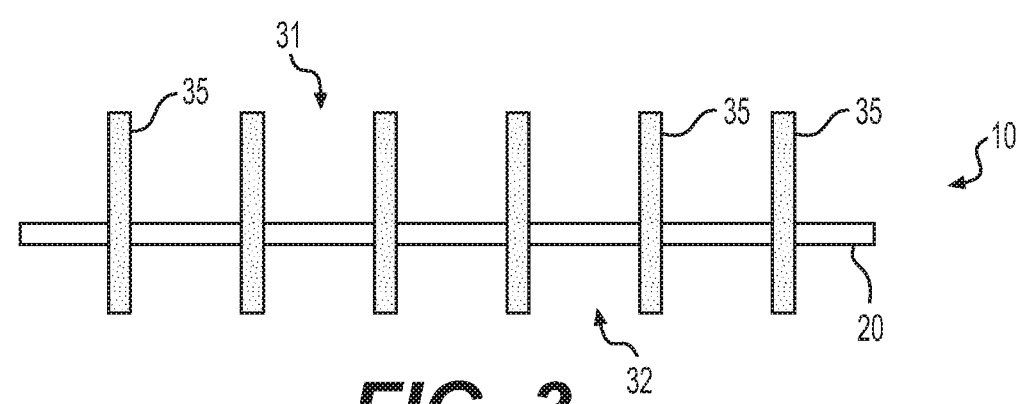
FIG. 3 is an illustration of a composite ECPD geotextile having first and second wicking layers.

Referring to FIG. 2, a composite ECPD geotextile 10 in accordance with the present invention comprises a drainage layer 20 and a wicking layer 30 disposed in liquid transport communication with the drainage layer 20. The wicking layer 30 comprises wicking yarns extending outwardly from one side of the drainage layer 20. In another aspect, the composite ECPD geotextile 10 comprises a first wicking layer 31 extending outwardly from one side of the drainage layer and a second wicking layer 32 extending outwardly from the opposite side of the drainage layer 20, as illustrated in FIG. 3.

Drainage Layer

The drainage layer of the composite ECPD geotextile can be a fibrous nonwoven, woven, or knitted fabric. Furthermore, as will be appreciated by one of skill in the art, any structure which will facilitate cross-plane liquid flow and to which the wicking layer can be attached is suitable for use as the drainage layer.

Any conventional woven fabric which facilitates cross-plane liquid flow can be employed as the drainage layer of the composite ECPD geotextile. Non-limiting examples of woven fabrics include plain, multi-pick, twill, and satin, all of which are discussed above. Although not required, wicking fibers and/or yarn can be employed in the construction of the drainage layer as an optional feature. Nonwoven fabrics are known in the art and are formed of staple fibers derived from one or more sources utilized in the nonwoven fabric industry. As indicated above, the nonwoven fabric can optionally include wicking fibers in staple fiber form. The nonwoven fabric can be formed by any conventional web manufacturing process, such as, a wet-laying process or an air-laying process, or by other techniques utilized in non-wovens industry. Staple fibers can be formed of any of the polymers described above for the non-wicking and wicking yarns. Further, staple fibers formed from wicking fibers and/or yarn can be treated with hydrophilizing agents, to include without limitation the hydrophilizing agents discussed above.

Wicking Layer

Figure 4:
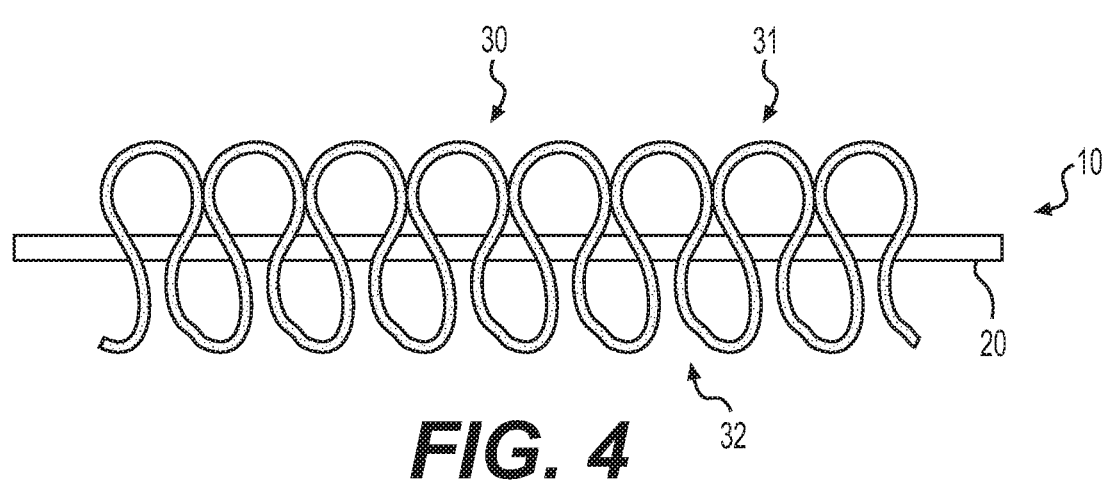
FIG. 4 is an illustration of a tufted composite ECPD geotextile.
Figure 5:
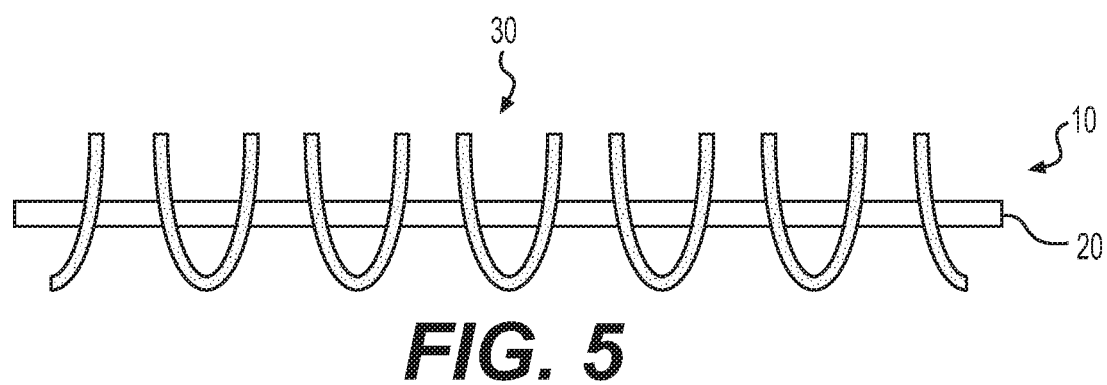
FIG. 5 is an illustration of a tufted composite ECPD geotextile having cut loops.

With continued reference to FIG. 2 and additionally to FIGS. 3-5, techniques utilized in the carpet industry for securing yarns to a backing material can be utilized to form the composite ECPD geotextile. Such techniques include, but are not limited to, tufting and/or stitching. As will be appreciated by those of skill in the art, any method which attaches yarns to a backing material so that the yarns extend outwardly from the backing material can be employed to form the composite ECPD geotextile.

Tufting is a technique well-known in the carpet manufacturing industry. Wicking staple fiber, staple yarn, bulk-continuous filament and/or bulk-continuous yarn can be utilized in the tufting process. Like tufted carpet, as illustrated in FIG. 3, the composite ECPD geotextile can be formed on a loom by simultaneously interlacing face yarns, i.e., wicking fibers, and drainage layer yarns into a complete product. The manufacture of the composite ECPD geotextile can include, for example, the tufting of face yarn into the drainage layer by a conventional needle punching operation. Tufting needles disposed across the width of the drainage layer penetrate the drainage layer to dispose loops of face yarn comprising the wicking layer on the bottom side thereof. The tufts are held in the drainage layer by the friction of the penetrating strands of yarn of the wicking layer. A looper, or flat hook, seizes and releases the loop of yarn while the needle pulls back up; the drainage layer is shifted forward and the needle once more pierces the drainage layer further on. FIG. 4 is an illustration in which the composite geotextile has tufted first and second wicking layers.

To make cut pile, a looper facing the opposite direction is fitted with a knife that acts like a pair of scissors, snipping the loop. Such loops can be uncut or cut to provide the ultimate pile face of the wicking layer, as illustrated in FIG. 5. Optionally, a water-soluble binder or adhesive can be applied to the side of the drainage layer opposite the wicking layer and the tufts of the wicking layer to temporarily adhere the yarns/fibers of the cut pile wicking layer to the drainage layer. This can be beneficial during installation of the cross-plane drainage fabric in the civil engineering project to assist in holding the tufts forming the wicking layer in place. Such adhesives solubilize and dissipate from the fabric upon exposure to water.

Unsaturated Soil Drainage System

Figure 6:
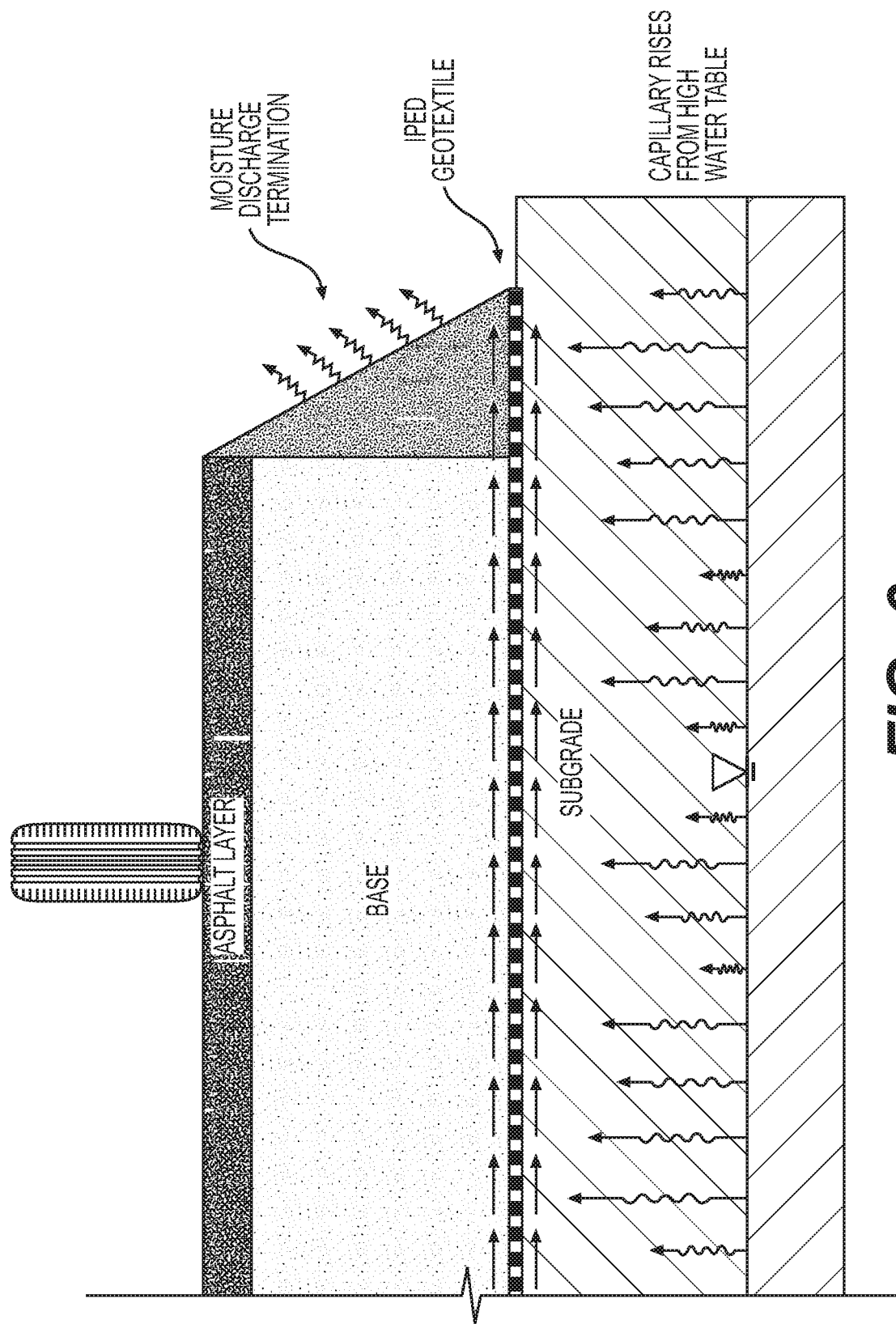
FIG. 6 an unsaturated soil drainage system employing an ECPD geotextile in accordance with the present invention.

Referring to FIG. 6, an unsaturated soil drainage system comprises an ECPD geotextile, a soil layer disposed over the ECPD geotextile, and a base layer, such as an asphalt treated base, disposed on the soil layer. Asphalt and/or concrete are disposed on the base layer. The ECPD geotextile is disposed on a soil bed. Typically, the soil bed is raised above the water table to form side drains which facilitate water drainage. The thickness of the soil bed is conventional. For example, soil bed can be 40 inches above the water table. Soil layer, such as an unsaturated soil, should be of a sufficient thickness as to allow water drainage from the base layer to the ECPD geotextile. For example, the thickness of the soil layer is about 13 inches. However, the thickness can be varied as necessary depending upon soil conditions.

An ECPD geotextile provides drainage under unsaturated conditions and significantly minimizes or eliminates the development of a capillary break. Unlike other flow problems in geotechnical and transportation engineering (e.g. drainage of surface water), while the volume of liquid stored within pavement layers may not be particularly significant, it is particularly difficult to eliminate. FIG. 4 shows the use of the ECPD geosynthetic to reduce excess water that penetrates into the base and subbase materials through downward infiltration, as well as through accumulation due to a capillary barrier.

Control of Pavement Damage Caused by Expansive Clay Subgrades

Expansive clay soils are soils that swell upon wetting and shrink upon drying. Typically, the expansive nature of a soil is classified by the plasticity index (PI). Soils with low swelling potential will have a PI in the range of 0 to 15, medium swell potential soils will have a PI of 10 to 35, high swell potential soils will have a PI of 20 to 55, and very high swell potential soils will have a PI of 35 and above (ASTM D4829). Expansive clay soils cause the development of longitudinal cracks in roadways. These environmentally-induced longitudinal cracks develop toward the pavement shoulders as a consequence of moisture content variations in the subgrade. Environmental moisture variations (e.g. rainy or dry periods) can reach the shoulder of a typical pavement comparatively easier than the center of a pavement. Consequently, the edges of the pavement will shrink during dry periods and will swell during rainy periods. However, because the center of the pavement does not experience such volumetric changes, differential settlements develop between the center and edge of the pavement. During particular dry seasons, the flexion of the pavement will result in tension toward the surface layer, leading to possibly significant longitudinal cracks.

Figure 7:
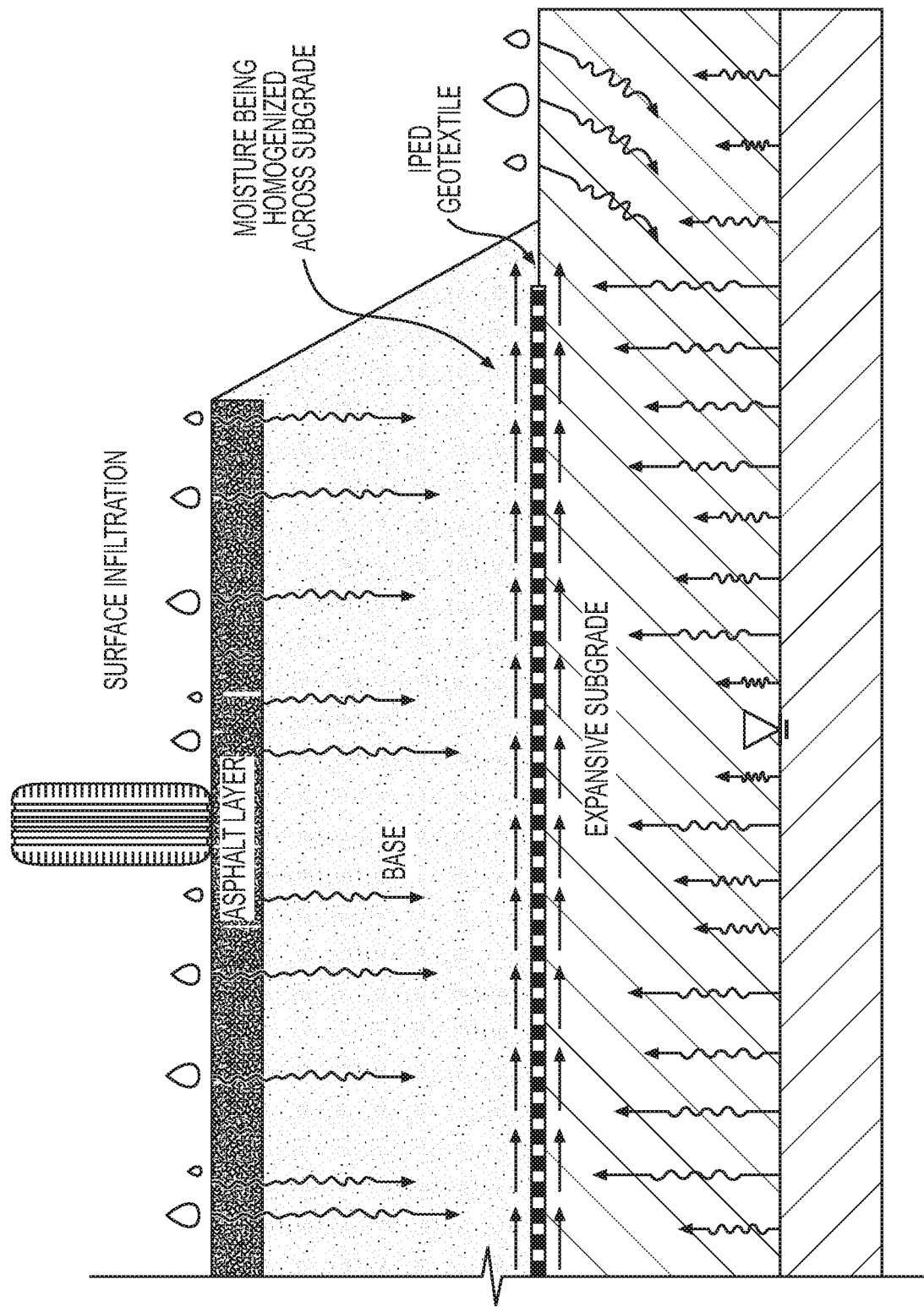
FIG. 7 is an illustration showing an ECPD geotextile at the interface of a base layer and an expansive clay subgrade.

FIG. 7 illustrates the effect of placing an ECPD geotextile at the interface of the base layer and an expansive clay subgrade. The geotextile is able to homogenize the distribution of water along its entire length. Accordingly, while moisture variations can occur closer to the pavement edge, the ECPD geotextile facilitates migration of moisture under unsaturated conditions, resulting in a comparatively uniform moisture distribution across the width of the pavement structure. In the subgrade, this improved uniform moisture distribution will minimize differential vertical movements in the pavement and thus mitigate the development of longitudinal cracking. In this application of the ECPD geotextile, the ECPD geotextile does not have a discharge termination segment. When functioning to homogenize moisture content across the pavement width, rather than to strictly promote outward drainage, the ECPD geotextile terminates without a daylighting segment to facilitate homogenization of moisture.

Enhanced Lateral Drainage in Projects Involving Soil Improvement

ECPD geotextiles can be employed to provide or complement the lateral drainage needed in soil improvement projects involving preloading and surcharge of soft soils, with or without accelerated consolidation using prefabricated vertical drains. A non-limiting example of soil improvement projects includes repair of settlement-related damage. The inclusion of ECPD geotextiles in these projects capitalizes on their versatility, functioning not only to enhance lateral drainage, but to also achieve separation and subgrade reinforcement, all of which are particularly relevant functions when dealing with soft soil subgrades.

Figure 8:
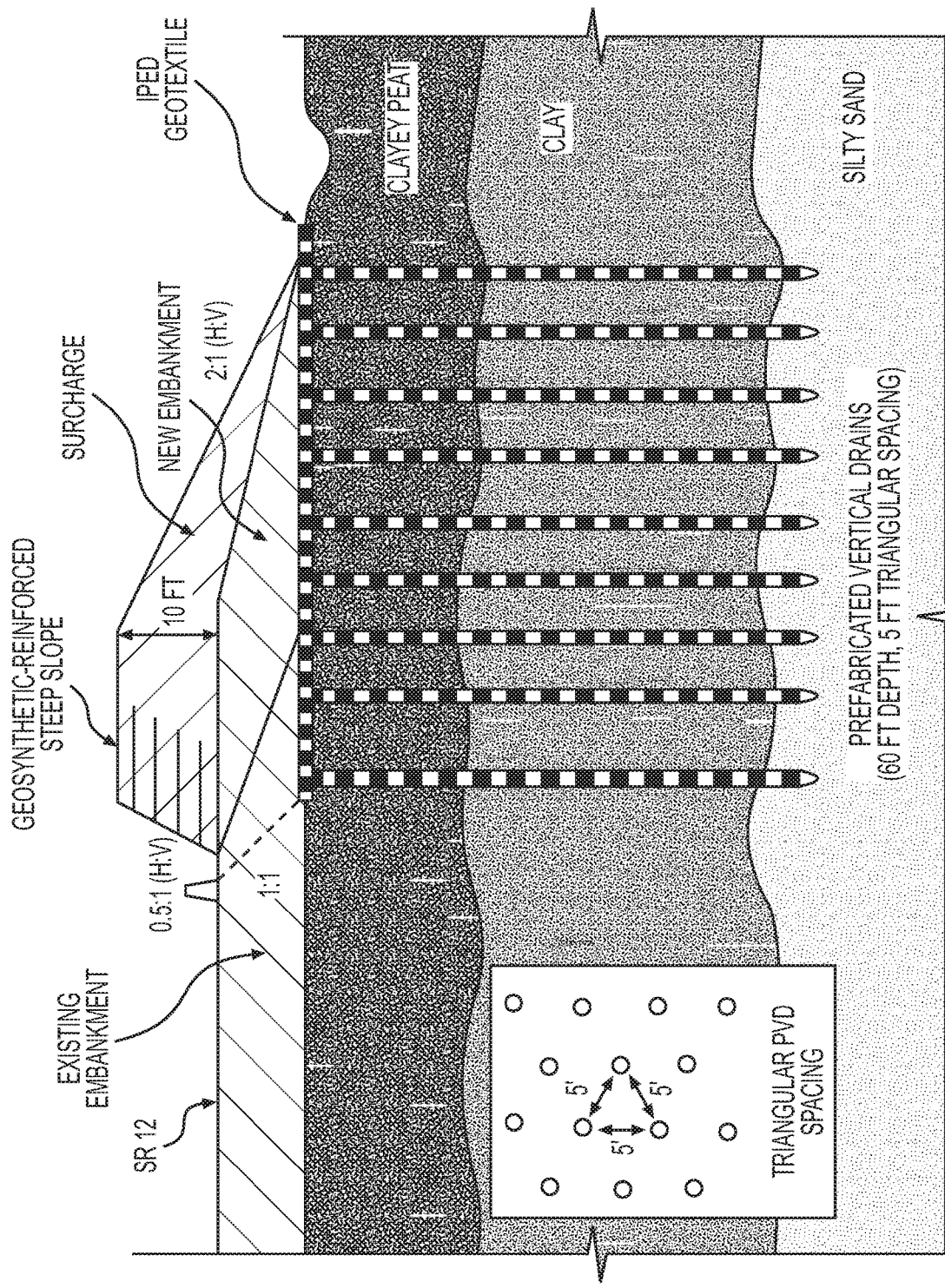
FIG. 8 is an illustration showing an ECPD geotextile providing lateral drainage, separation, and subgrade stabilization.

FIG. 8 is an illustration of the use of the ECPD geotextile to provide lateral drainage, separation, and subgrade stabilization in a soil improvement project involving multiple types of soil, such as a civil structure disposed over peat, clay, and sandy soils. Vertical drains can be placed, but depending upon the soil/base conditions may not be necessary, through the diverse soils. In this illustration, the vertical drains are space in a triangular pattern. Spacing, arrangement, and number of vertical drains depends upon the soil conditions. The ECPD geotextile is placed above the vertical drains and fill disposed over the geotextile.

Enhanced Lateral Drainage of Moisture Migration Upward from A High Water Table

Roadways in areas where the groundwater table is high are prone to problems associated with high moisture content in the subgrade. Water migrates from the elevation of the water table to the roadway due to capillary action, which is the ability of water to flow in narrow soil pore spaces against the pull of gravity. Capillary rise develops within the comparatively small diameter of soil pores (equivalent to tortuous capillary tubes) under the action of water surface tension, and is responsible for moving water from the groundwater table (where water pressure is zero) to the overlying unsaturated soils (where water pressure is negative). Fine-grained soils, which are common subgrade materials, result in a higher capillary rise than coarse-grained soils.

An ECPD geotextile can be employed in a high water table scenario. The ECPD geotextile provides lateral drainage to carry excess water outside the structural pavement layers. Specifically, upwardly migrating moisture that reaches the ECPD geotextile can be laterally diverted to the pavement shoulders, where it leaves the system as evapotranspiration. Use of the ECPD geotextile into roadway design can minimize the problems associated with moisture-related weakening of the pavement subgrade or any underlying soil system.

EXAMPLES

With respect to the following discussion, reference is made to van Genuchten, M. Th. (1980), A closed-form equation for predicting the hydraulic conductivity of unsaturated soils, *Soil Science Society of America Journal*, 44 (5), 892-898.

To quantify the water storage capacity in porous media, the volumetric water content, θ, is measured as a function of suction. Volumetric water content is defined as the ratio between volume of water and the total volume in a geomaterial. The relationship between moisture and suction defines the water retention curve, which indicates the amount of water present in the pore space.

A soil water retention curve displays how the volumetric water content for a material changes with increasing or decreasing suction. The desorption curve (drying path) starts with an initially saturated sample until the sample reaches residual conditions with increasing suction. The initial saturated volumetric water content at low suctions is the same as the porosity since all the air in the sample has been replaced by water. The air entry value is the suction value at which the sample first starts to desaturate. The final residual water content corresponds to the small amount of water held in the soil pores with no pathway to escape. The adsorption curve (wetting path) starts with an initially dry sample until the sample becomes saturated with decreasing suction. The water entry value is the suction value at which water is first able to enter the sample. There is some hysteresis between the two curves. This is due to the fact that during drying, large pores will drain first and the small pores will drain second. The order is reversed upon wetting, however, as the large pores prevent some of the small pores from filling and cause air entrapment, creating the hysteresis that prevents complete saturation. The following method was employed to determine Flow Delta and moisture content at breakthrough.

Example 1

TenCate Test for Determining Flow Delta

A soil column was employed to monitor capillary barrier formation created by geotextiles in unsaturated soil and determine Flow Delta. Soil, classified as a lean clay (CL) by the United Soil Classification System, obtained from a borrow pit at the site of the Rocky Mountain Arsenal (RMA) in Denver, Colo., was disposed in the column. The RMA soil was prepared by placing wet RMA soil on a tarp to air dry for a few days. After drying, the clay was run through a soil crusher twice to break apart the intact soil clods. Next, the soil was sieved through a #40 sieve. Moisture was then added to the air dry RMA soil to achieve the desired initial water content.

Atterberg Limit tests conducted on the RMA soil indicated a liquid limit (LL) of 32.3%, a plastic limit (PL) of 11.6%, and a plasticity index (PI) of 20. The specific gravity ($G_s$) of the RMA soil was determined to be 2.71. Per standard proctor compaction, the maximum dry density ($\gamma_{d,max}$) of the RMA soil was found to be 1.905 g/cm$^3$ (119 pcf) with an optimum water content ($w_{opt}$) of 15%. The saturated hydraulic conductivity ($K_{sat}$) of the RMA soil at 80% relative compaction determined from a flexible wall permeameter test was approximately 8.2×10$^{-5}$ cm/s (equivalent to a volumetric flow rate of 1.50 mL/min).

The soil column was 19.7 cm in diameter clear acrylic column with 15 cm of RMA soil above and 18 cm of RMA soil below the geotextile. The RMA soil was compacted in lifts of 3 cm both above and below the geotextile. Moisture detecting probes were positioned 2 cm, 8 cm, and 13 cm above the soil-geotextile interface and 2 cm below the geotextile. The clear acrylic column permits visual observation of the moisture fronts. Water was evenly distributed at the top of the soil column at a constant rate of approximately 0.40 mL/min. The diameter of the geotextile specimens was about 1 cm larger than the column diameter to prevent side leakage at the interface of the soil and geotextile. A perforated plate was placed at the base of the column to allow water to drain from the column. Filter paper was placed immediately above the plate to prevent fines migration from the soil base. To minimize soil moisture loss from evaporation, a sheet of plastic wrap was stretched on top of the column.

If a geotextile causes a capillary barrier, moisture builds up above the geotextile until a certain height, at which point breakthrough is achieved and water flows through the geotextile to the bottom soil layer. At this point the moisture detecting probe below the geotextile detects breakthrough due to an increase in moisture content.

All column tests used the lean clay RMA soil compacted to approximately 80% relative compaction, 1.47 g/cm$^3$ dry density, and a porosity of 0.46. The target initial volumetric water content of each test is 0.15. All other conditions for each test were kept the same unless otherwise stated. Recorded data form the probes is in the form of volumetric moisture content versus time for the duration of a test. However, the results are presented as volumetric water content versus inflow. The applied flow rate of each test is multiplied by the test duration, thereby permitting cumulative inflow to be plotted.

Water flow is initiated at the top of the column and the wetting front proceeds down the column. Until the moisture front reaches a respective probe, the initial volumetric water content (e.g., 0.15) is respectively indicated until each probe sees an increase in water content. The moisture content reaches a "flow equilibrium" moisture content which corresponds to the flow rate applied to the column. In these tests, the flow equilibrium moisture contents varied from 0.25 to 0.30 for all sensors.

Volumetric Moisture Content at Breakthrough (VMCB) is a parameter used to evaluate the strength of the capillary barrier. VMCB is the measured moisture content of the soil as detected by the probe nearest to and above the geotextile at the moment of breakthrough. The higher the VMCB, the stronger the capillary barrier that is developed. A VMCB below 0.38 indicates that a capillary barrier substantially did not form, if at all.

Flow Delta is a parameter used to determine the effectiveness of any developed capillary barrier. This parameter measures the time it takes for the wetting front to progress from the probe immediately above the geotextile, to the probe immediately below the geotextile. The larger the Flow Delta, the stronger the capillary barrier. Flow Delta is reported as inflow in terms of mL and is calculated as follows:

Flow Delta=Inflow at Breakthrough minus Inflow at Barrier

"Inflow at Breakthrough" is the amount of inflow occurring at the moment the probe immediately below the geotextile detects an increase in moisture. "Inflow at Barrier" is the amount of inflow occurring at the moment the probe nearest to and above the geotextile detects an increase in moisture. A Flow Delta below 490 mL indicates that a capillary barrier substantially did not form, if at all. An example of a determination of Flow Delta is provided in Example 2.

Example 2

Figure 9:
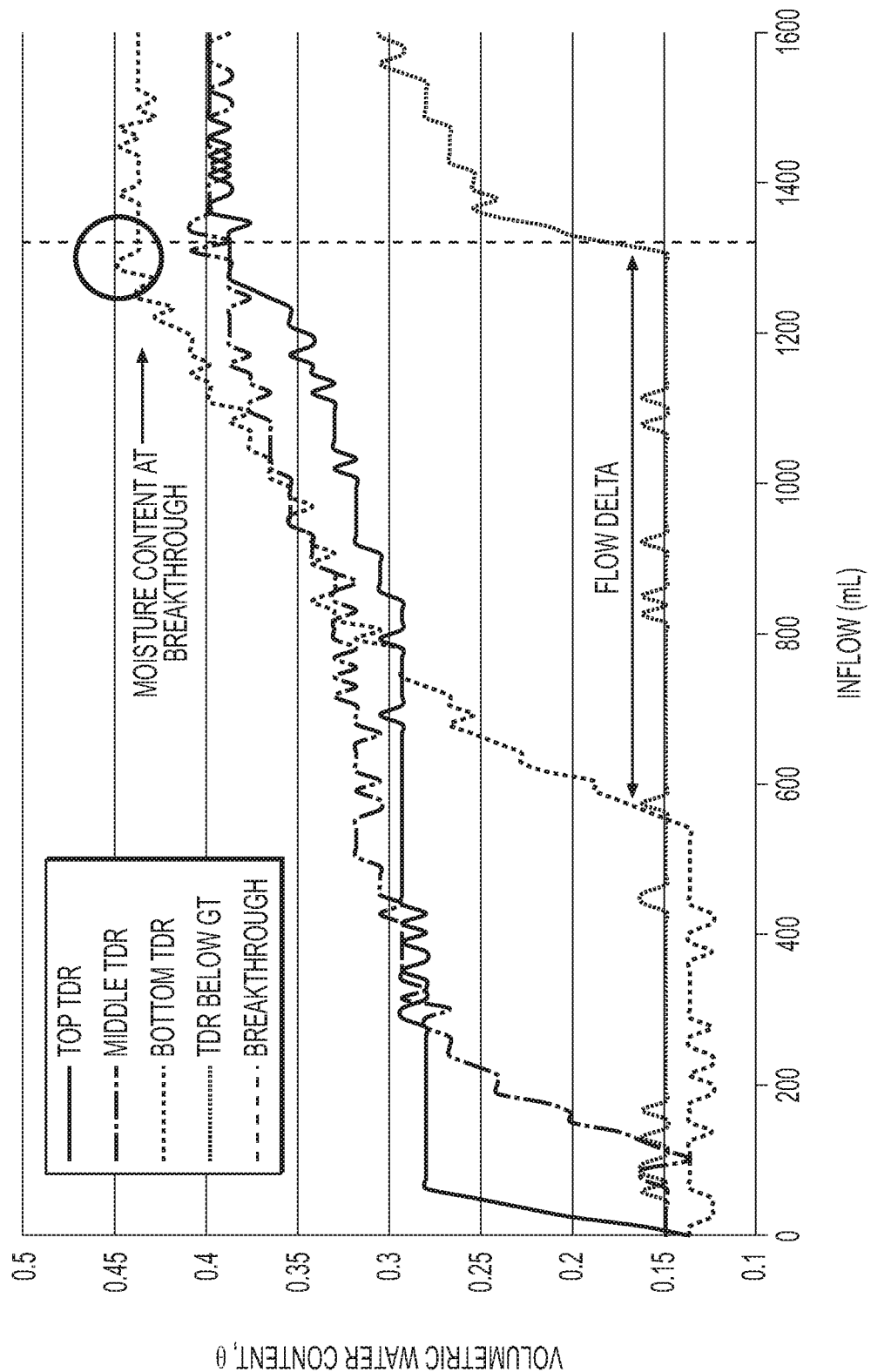
FIG. 9 is a plot illustrating volumetric moisture content versus inflow for GT1.

FIG. 9 is a plot illustrating volumetric moisture content versus inflow for GT1 (see Table 1 for description of geotextiles tested). The test was conducted under the conditions described above for the TenCate Test. As indicated in FIG. 9, Flow Delta was determined by subtracting the inflow of the probe nearest to and above the geotextile at the point an increase in moisture is detected from the inflow at the moment the probe below the geotextile detects an increase in moister, i.e., at breakthrough.

Referring to FIG. 7, the estimated breakthrough observed by the probe below the geotextile occurred around 1,320 mL of inflow into the test. At the point of breakthrough, the probe immediately above the geotextile reported a breakthrough volumetric moisture content of 0.44. The soil in the column was at a relative compaction level of 80%, which corresponds to a porosity (i.e., saturated volumetric moisture content) of 0.46. This means that the saturation level of the soil above the geotextile at the time of breakthrough was approximately 96%. Therefore, the capillary barrier created by the geotextile did not allow water to pass through the geotextile until the clay soil was almost completely saturated. The Flow Delta recorded in this test was 756 mL, which corresponds to approximately 30 hours for the flow rate applied during this test. In addition to the extra moisture content buildup caused by the capillary barrier, the geotextile also caused a significant delay in allowing the moisture front to progress further into the soil column.

Example 3

Figure 10:
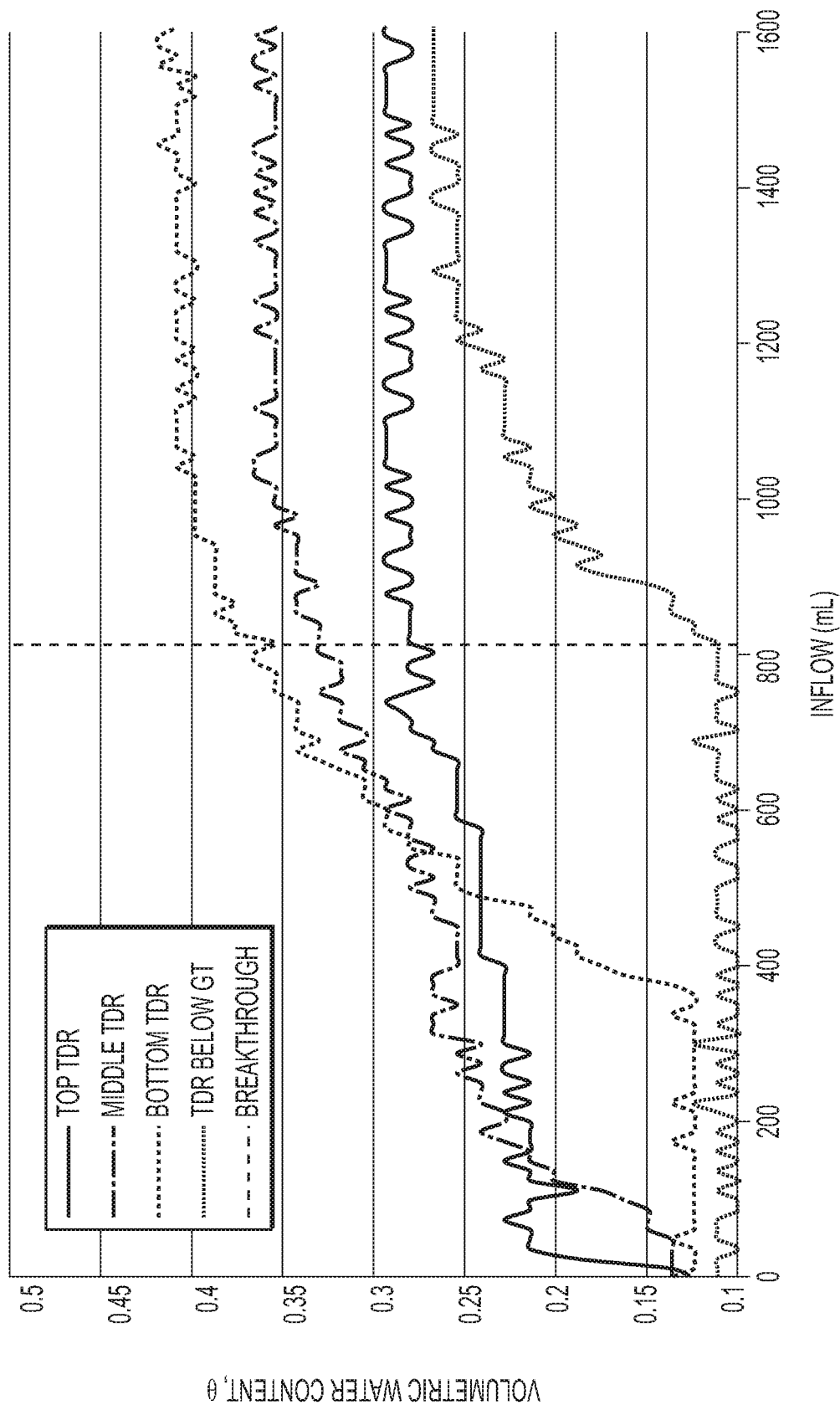
FIG. 10 is a plot illustrating volumetric moisture content versus inflow for GT4.

GT4 was tested to determine Flow Delta. Except for the flow rate applied to the column being 0.42 mL/min, the test was conducted under the conditions described above for the TenCate Test. The recorded moisture content data is provided in FIG. 10. The probe below the geotextile indicated that breakthrough occurred after 1,940 minutes, or 813 mL of inflow. The capillary barrier caused moisture to accumulate to a maximum of 0.41. The Flow Delta calculated for this test was 490 mL. It is observed from FIG. 10 that even after breakthrough occurred, moisture content above the geotextile still increased. This means that although some moisture had made it through the geotextile, the capillary barrier was still in effect. This behavior is termed partial breakthrough.

Example 4

Figure 11:
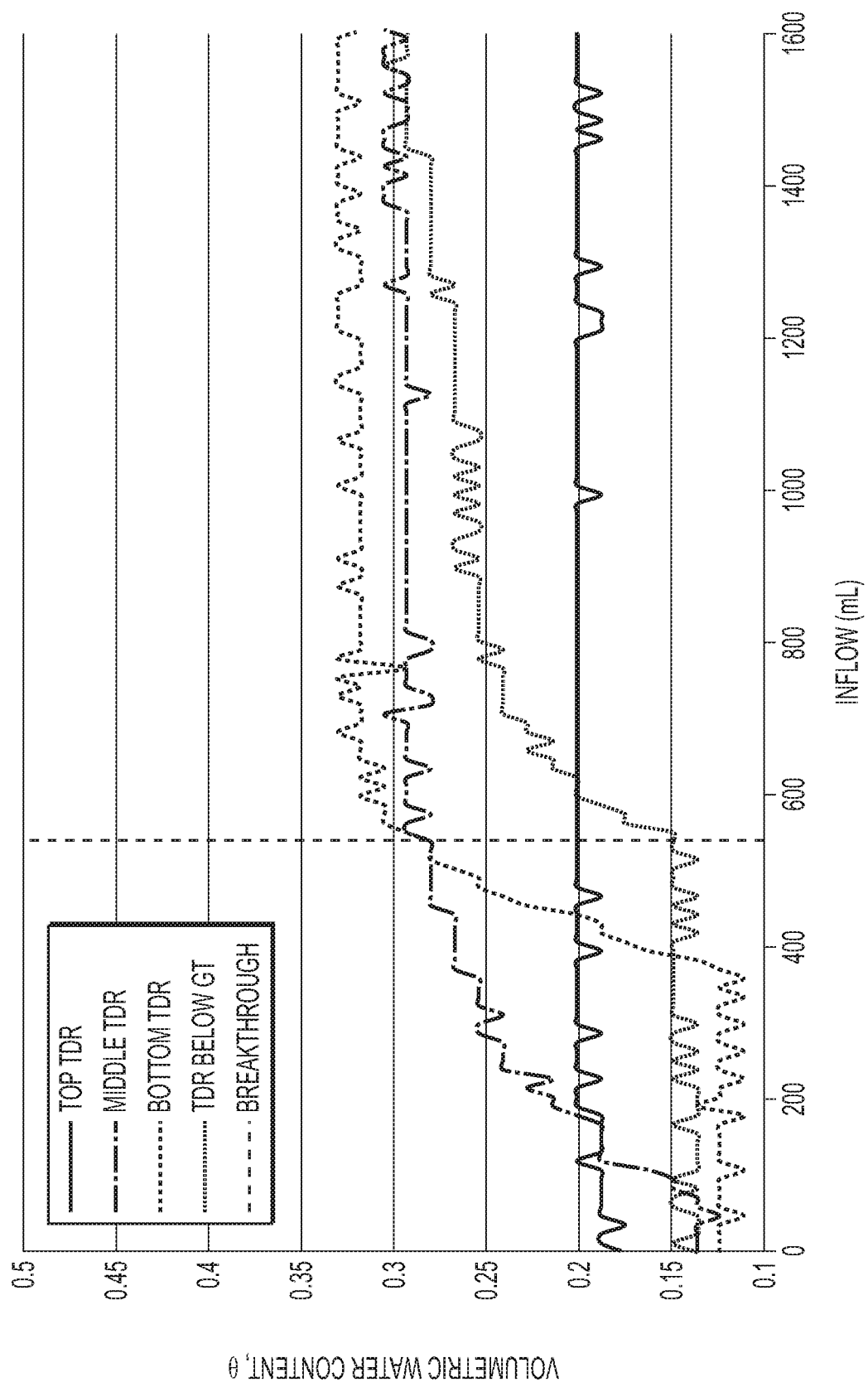
FIG. 11 is a plot illustrating volumetric moisture content versus inflow for GT5.

GT5 was tested to determine Flow Delta. GT5 is a two-layer single weave fabric containing 4DG wicking fibers. The test was conducted under the conditions described above for the TenCate Test. The recorded moisture content data is provided in FIG. 11. Breakthrough was detected by the probe below the geotextile at 1,350 minutes, or after 540 mL of cumulative inflow. The moisture content at the time of breakthrough as recorded by the probe 2 cm above the geotextile was 0.31. However, similar to GT4, there was additional moisture buildup after breakthrough to a final value of 0.33. The Flow Delta was observed to be 170 mL. The capillary barrier was still in effect at breakthrough.

Example 5

GT6 was tested to determine Flow Delta. The test was conducted under the conditions described above for the TenCate Test. The Flow Delta was found to be 190 and is reported in Table 2.

Example 6

GT7 was tested to determine Flow Delta. The test was conducted under the conditions described above for the TenCate Test. The Flow Delta was found to be 410 and is reported in Table 2.

Example 7

Figure 12:
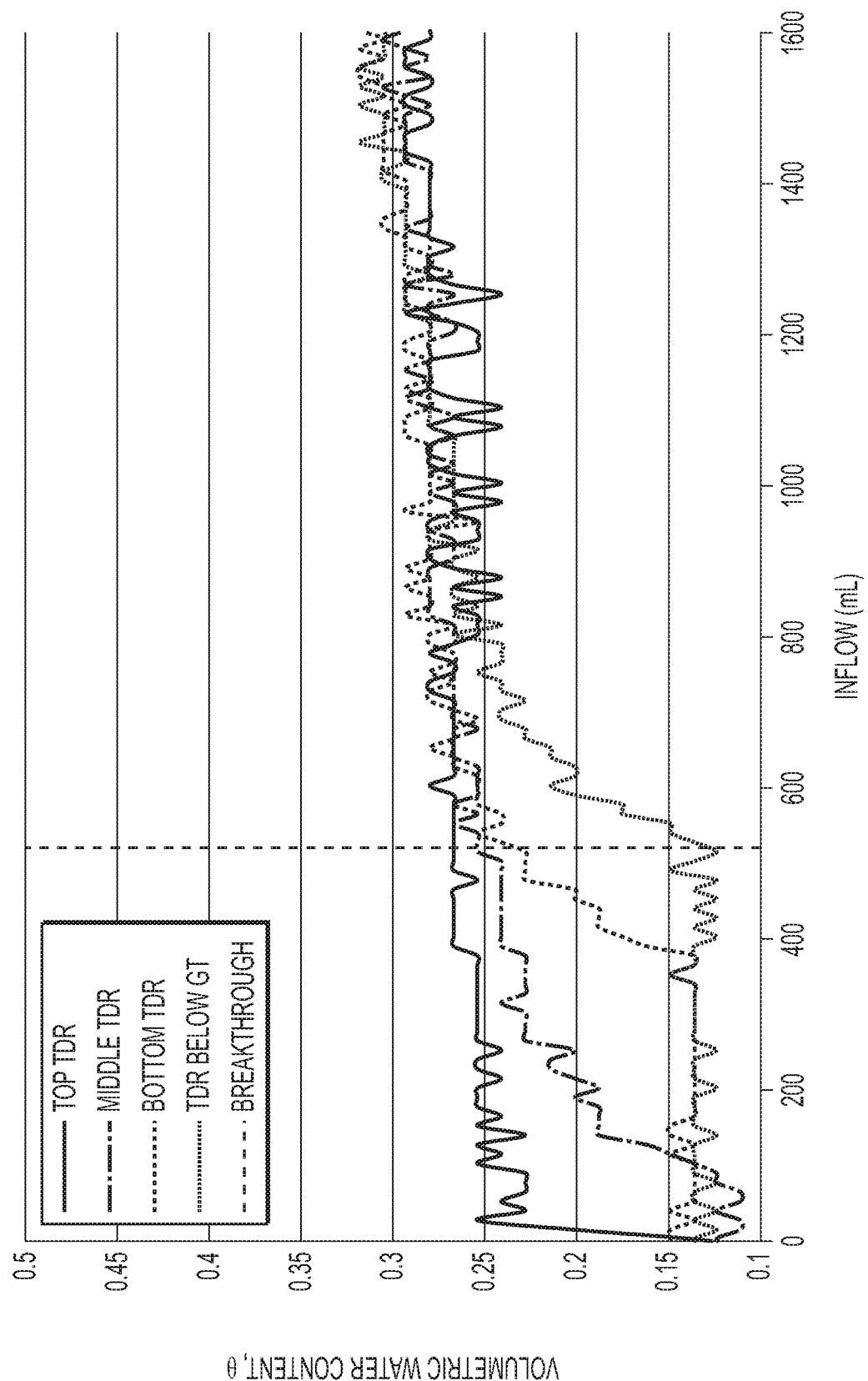
FIG. 12 is a plot illustrating volumetric moisture content versus inflow for GT8.

GT8 was tested to determine Flow Delta. GT8 is a single-layer woven fabric containing wicking fibers. Except for the flow rate applied to the column being 0.42 mL/min, the test was conducted under the conditions described above for the TenCate Test. The recorded moisture content data is provided in FIG. 12. Breakthrough was detected by the probe below the geotextile at 1,250 minutes, or after 521 mL of cumulative inflow. The moisture content at the time of breakthrough as recorded by the probe 2 cm above the geotextile was 0.25. The Flow Delta was observed to be 100 mL. Although there was a very slight increase in moisture content after breakthrough to a final value of 0.27, the results indicated that GT8 substantially did not form a capillary barrier, if at all. GT8 is a single-layer woven ECPD geotextile.

Example 8

GT3 was tested to determine Flow Delta. The test was conducted under the conditions described above for the TenCate Test. The Flow Delta was found to be 380 and is reported in Table 2.

Example 9

GT2 was tested to determine Flow Delta. The test was conducted under the conditions described above for the TenCate Test. The Flow Delta was found to be 607 and is reported in Table 2.

Example 10

GT15, a 100% 6 denier per fiber (DPF) polyester nonwoven geotextile, was tested to determine Flow Delta. The test was conducted under the conditions described above for the TenCate Test. This geotextile had the same standard DPF as GT1, except that GT15 was composed of PET fibers instead of the PP fibers in GT1. The column test for GT15 showed that GT15 caused a moisture content buildup of 0.44 and had a Flow Delta of 634 mL. The results for GT15 (not shown) were substantially the same as for GT1.

Example 11

Figure 13:
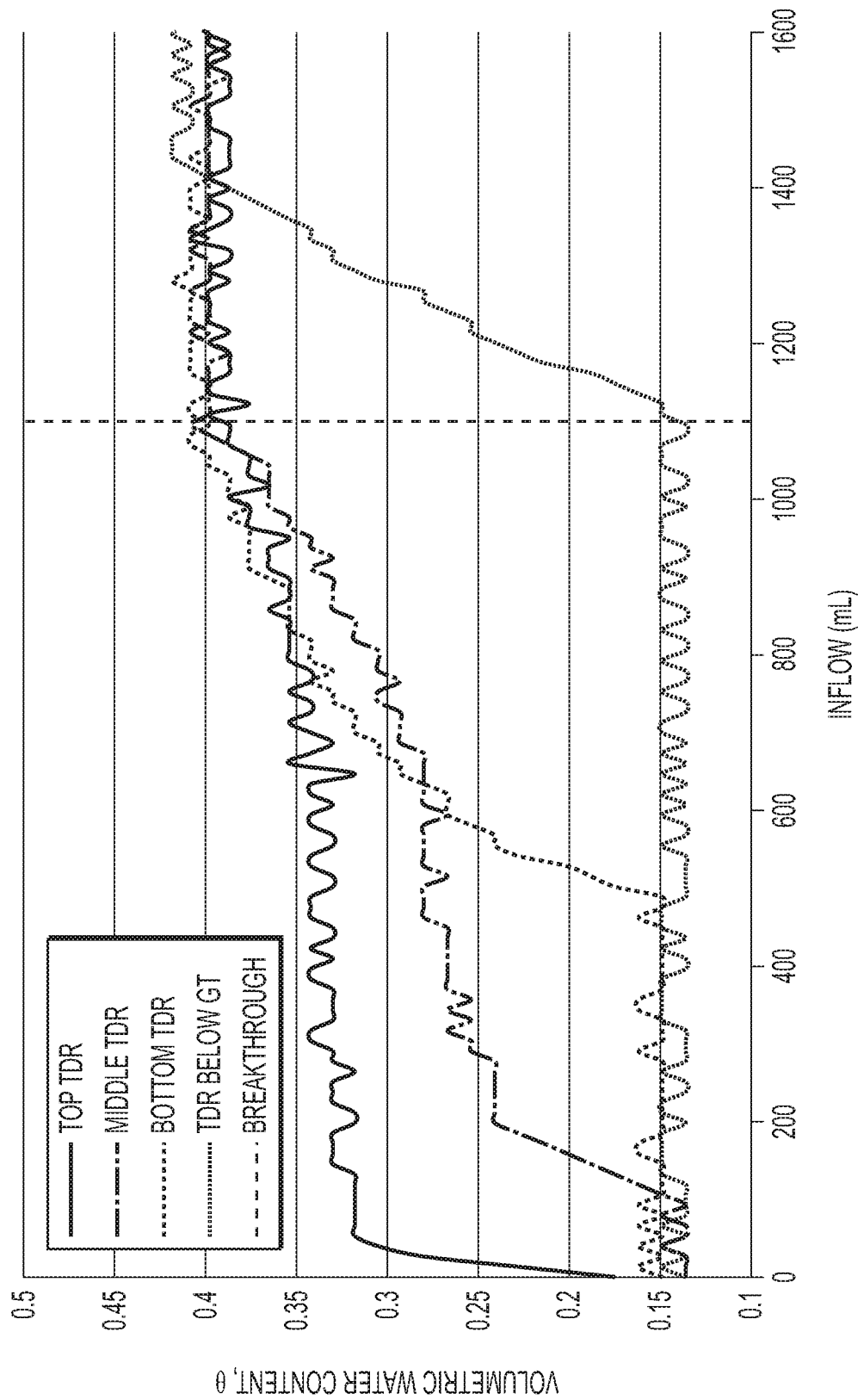
FIG. 13 is a plot illustrating volumetric moisture content versus inflow for GT14.

GT14 was tested to determine Flow Delta. The test was conducted under the conditions described above for the TenCate Test, except the flow rate was 0.44 mL/min. The recorded moisture content data is provided in FIG. 13. Breakthrough was detected by the probe below the geotextile at 2,500 minutes, or after 1,100 mL of cumulative inflow. The moisture content at the time of breakthrough as recorded by the probe 2 cm above the geotextile was 0.44. The Flow Delta was determined to be 616 mL.

Example 12

Figure 14:
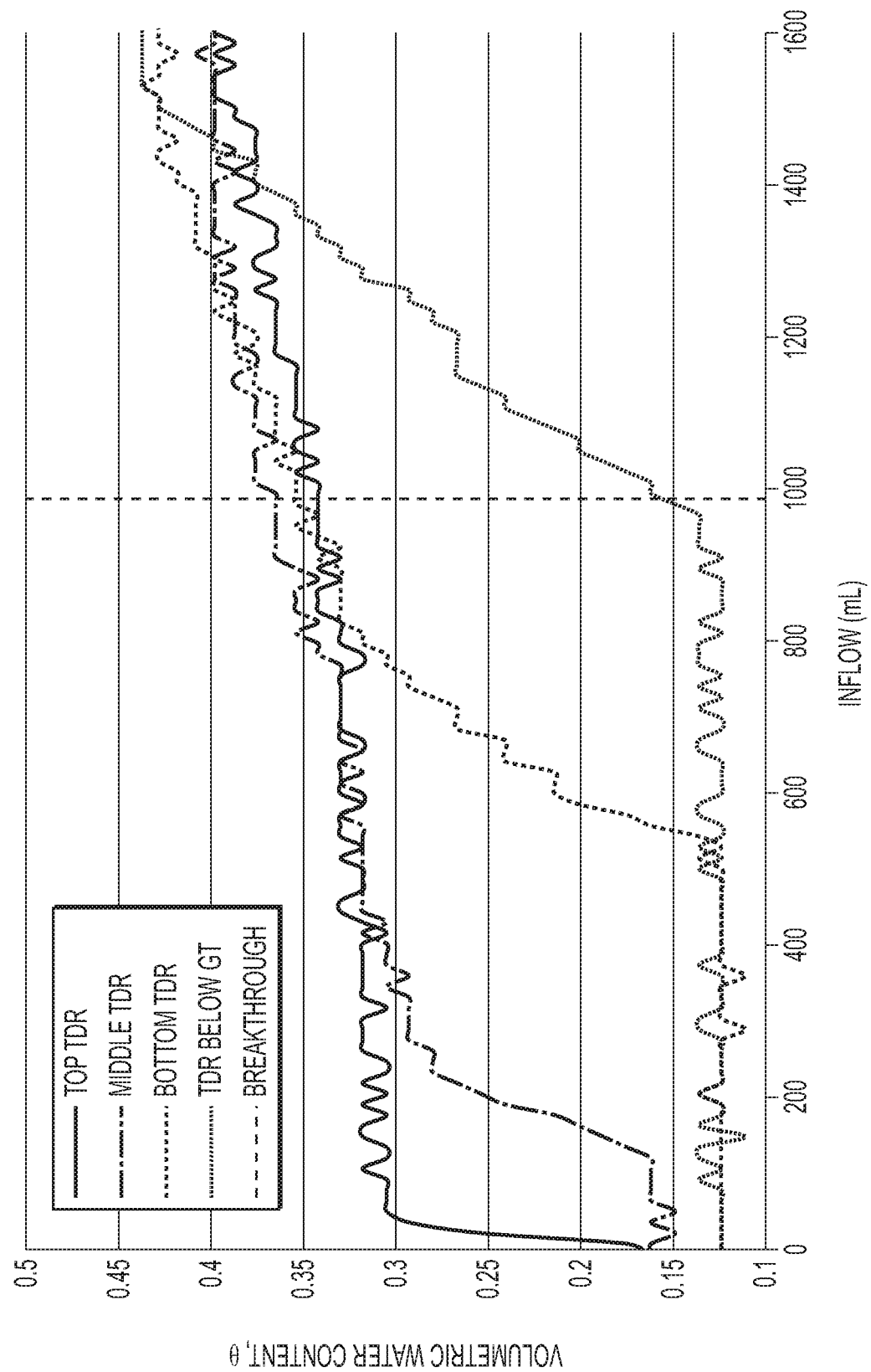
FIG. 14 is a plot illustrating volumetric moisture content versus inflow for GT11.

GT11, a nonwoven fabric composed only of wicking fibers, was tested to determine Flow Delta. The test was conducted under the conditions described above for the TenCate Test, except the flow rate was 0.47 mL/min. The recorded moisture content data is provided in FIG. 14. Breakthrough was detected by the probe below the geotextile at 2,100 minutes, or after 987 mL of cumulative inflow. The moisture content at the time of breakthrough as recorded by the probe 2 cm above the geotextile was 0.35. The Flow Delta was determined to be 447 mL. Moisture accumulation continued until reaching a maximum of 0.43 when outflow was detected.

Example 13

Figure 15:
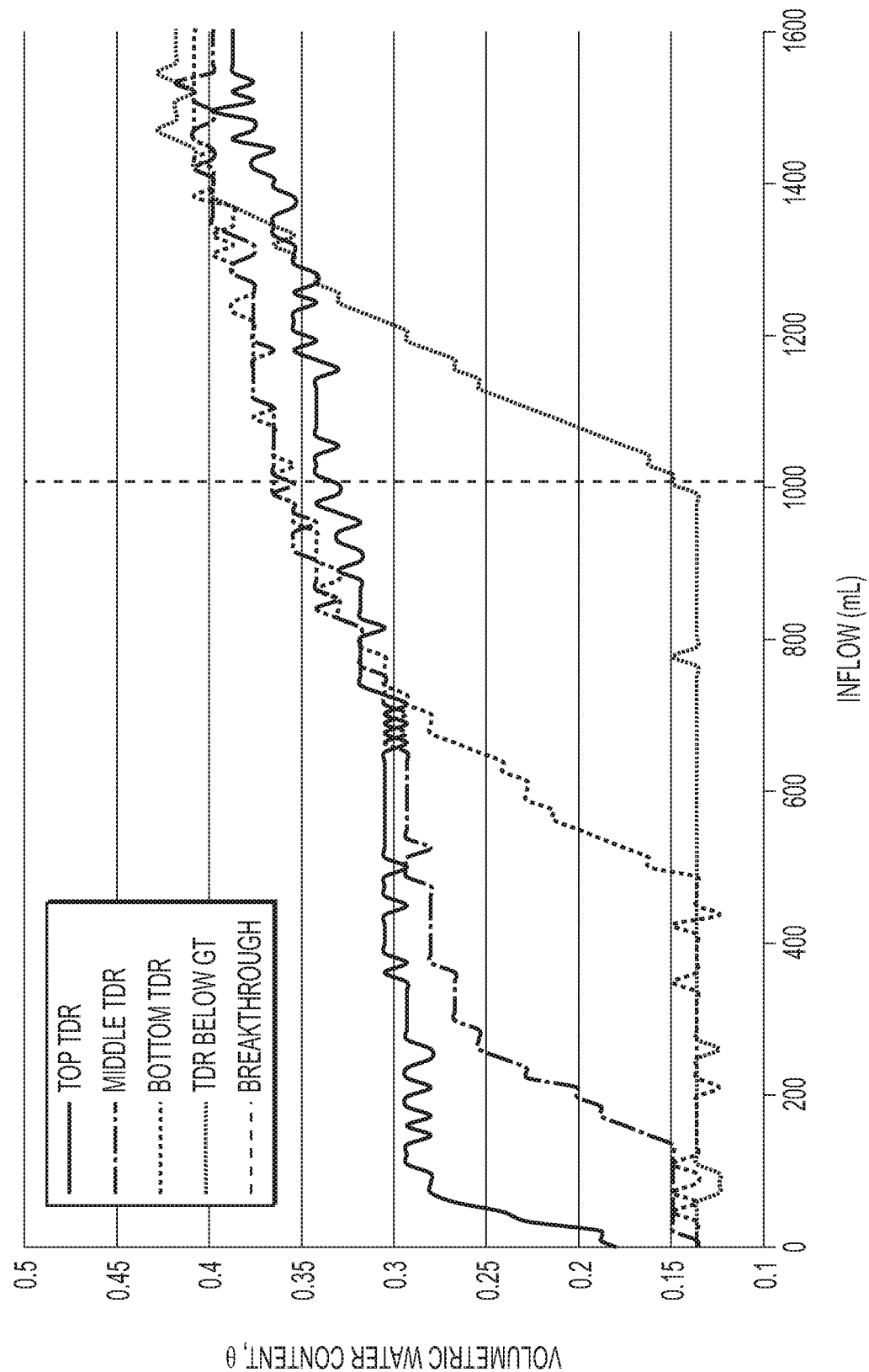
FIG. 15 is a plot illustrating volumetric moisture content versus inflow for GT13.

GT13, a nonwoven fabric composed of 50% of 4DG polyester wicking fibers and 50% of 60 DPF polypropylene fibers, was tested to determine Flow Delta. The test was conducted under the conditions described above for the TenCate Test, except the flow rate was 0.42 mL/min. The recorded moisture content data is provided in FIG. 15. Breakthrough was detected by the probe below the geotextile at 2,400 minutes, or after 1,008 mL of cumulative inflow. The moisture content at the time of breakthrough as recorded by the probe 2 cm above the geotextile was 0.36. The Flow Delta was determined to be 518 mL. Moisture accumulation continued until reaching a maximum of 0.42 when outflow was detected.

Example 14

Figure 16:
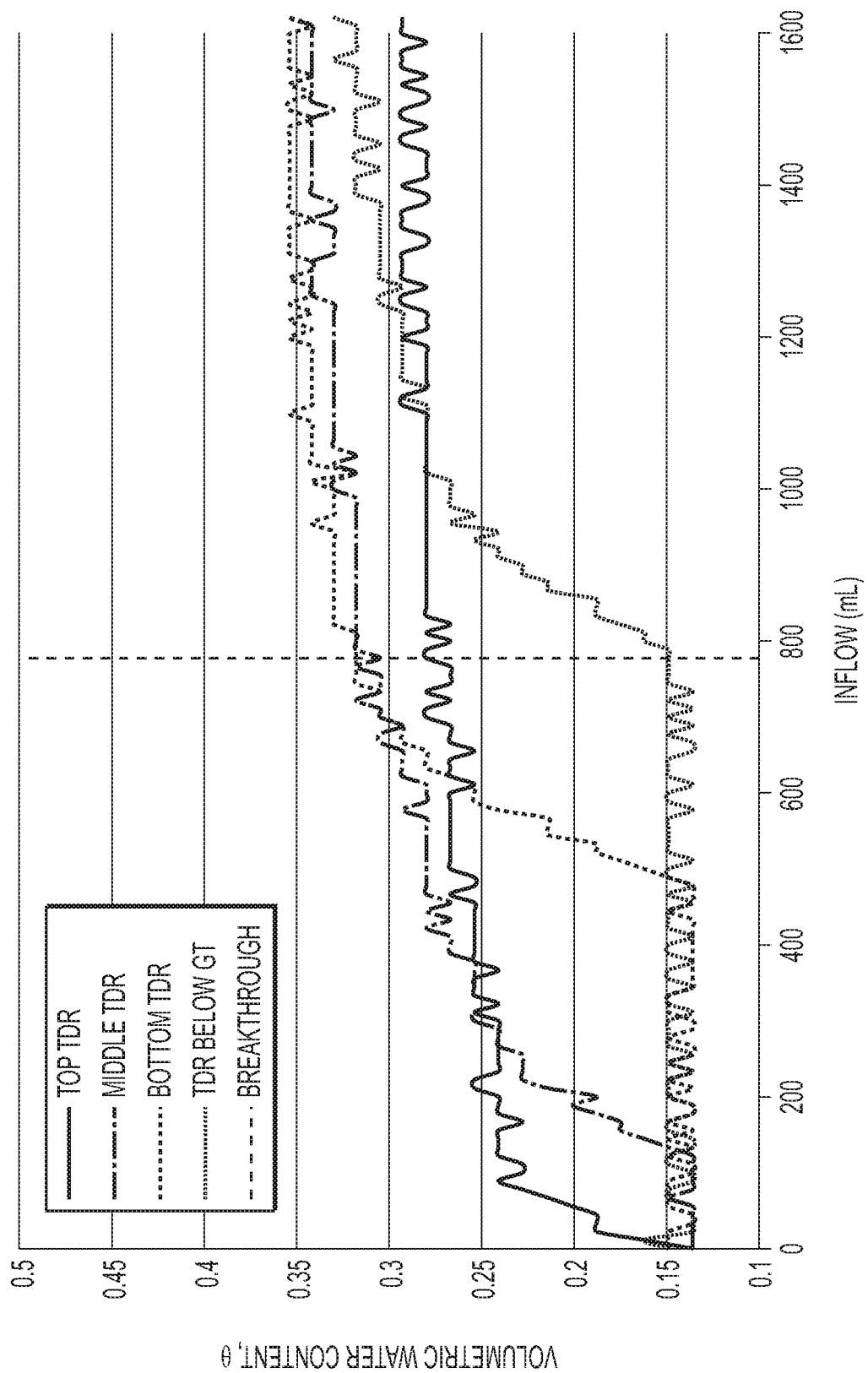
FIG. 16 is a plot illustrating volumetric moisture content versus inflow for GT21.

GT21, a nonwoven fabric composed of 100% 4DG polyester wicking fibers coated with a composition combining of Ultraphil TG and Invadine PBN (UI), was tested to determine Flow Delta. The test was conducted under the conditions described above for the TenCate Test. The recorded moisture content data is provided in FIG. 16. Breakthrough was detected by the probe below the geotextile at 2,100 minutes, or after 777 mL of cumulative inflow. The moisture content at the time of breakthrough as recorded by the probe 2 cm above the geotextile was 0.33, but continued to increase to a maximum of 0.35. The Flow Delta was determined to be 287 mL.

Example 15

Figure 17:
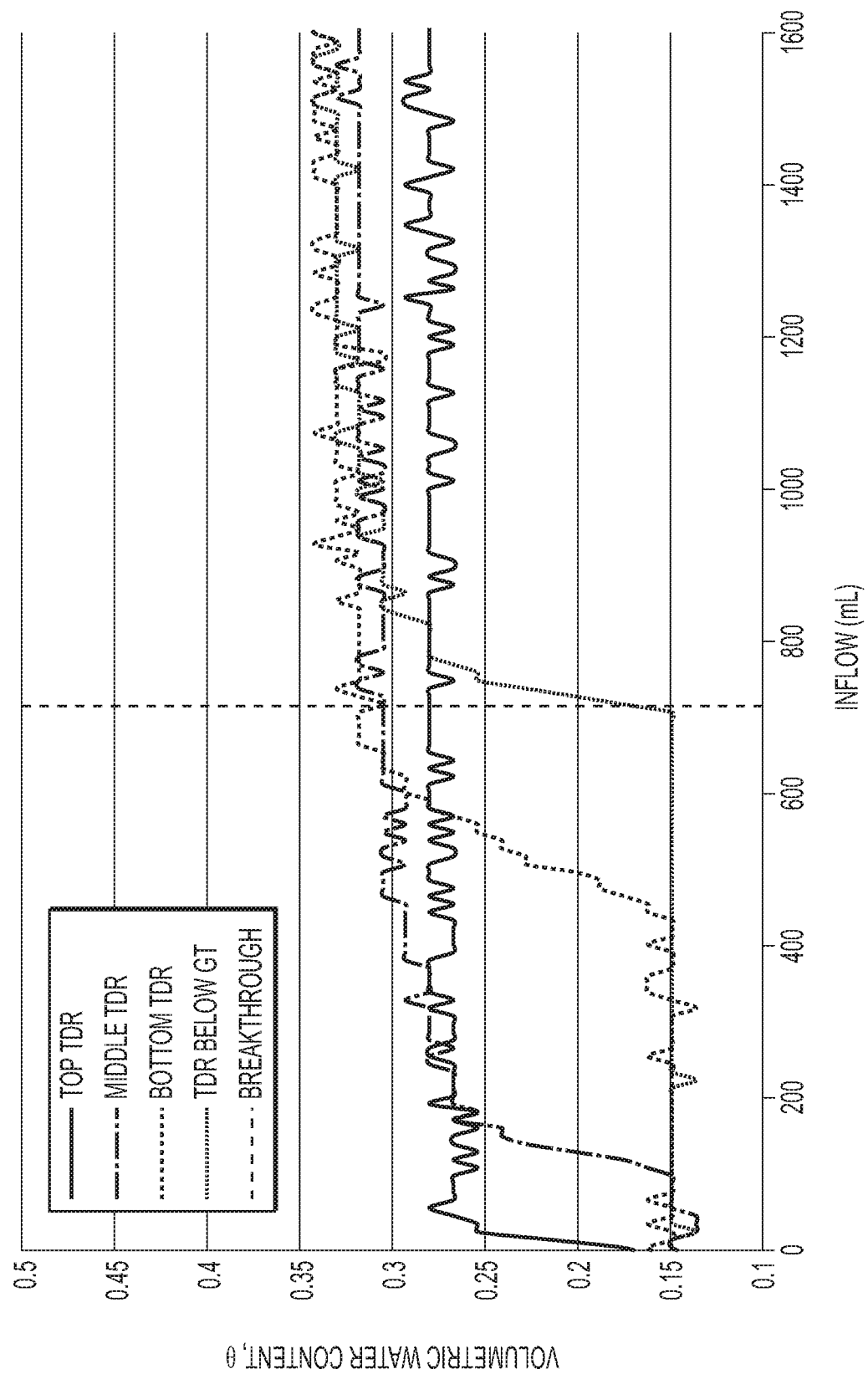
FIG. 17 is a plot illustrating volumetric moisture content versus inflow for GT20.

GT20, a nonwoven fabric composed of 100% 4DG polyester wicking fibers coated with a composition combining of Albaflow PAP-01, Dicrylan PSF, and Invadine PBN (ADI), was tested to determine Flow Delta. The test was conducted under the conditions described above for the TenCate Test. The recorded moisture content data is provided in FIG. 17. Breakthrough was detected by the probe below the geotextile at 2,043 minutes, or after 715 mL of cumulative inflow. The moisture content at the time of breakthrough as recorded by the probe 2 cm above the geotextile was 0.32, but continued to increase to a maximum of 0.34. The Flow Delta was determined to be 715 mL.

Table 3 presents a summary of column test results for all of the nonwoven geotextile blends with and without coatings. Each test was conducted under the conditions described above for the TenCate Test, except as provided in Examples 11-13. As evident from Table 3, the coatings assist in reducing the moisture buildup caused by a capillary barrier. Also, the ADI coating generally performed better than the UI coating.

Example 16

Figure 18:
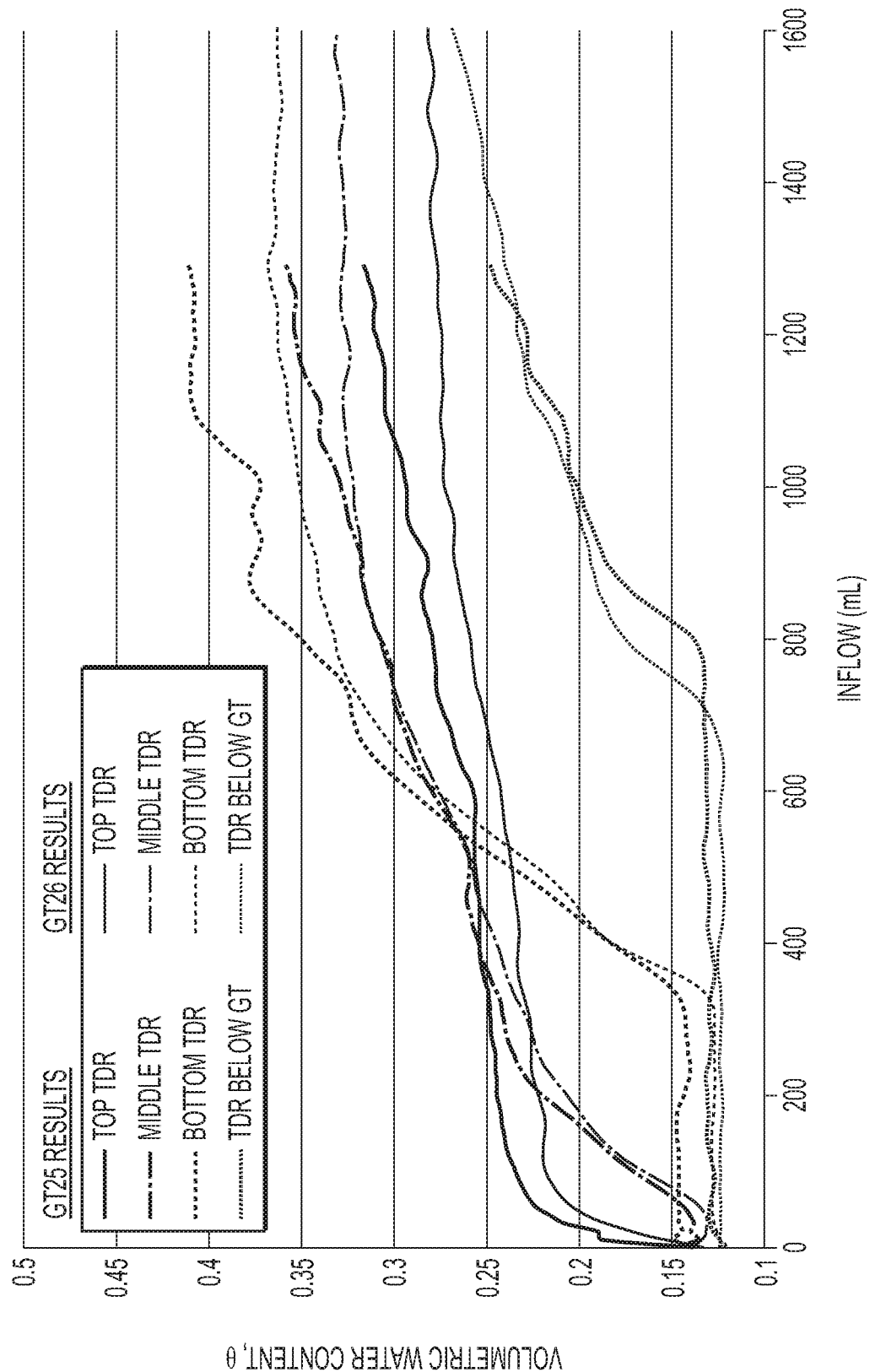
FIG. 18 is a plot illustrating volumetric moisture content versus inflow for GT25 and GT26.

Geotextiles GT25 and GT26 respectively utilized GT6 and GT5 woven geotextiles as respective drainage layers with, 4DG wicking fibers having a face weight of 12 osy needlepunched onto the drainage layers to create respective composite ECPD geotextiles as illustrated in FIG. 18. Each test was conducted under the conditions described above for the TenCate Test. The column test results for both of these geotextiles can be observed in FIG. 18. GT25 and GT26 perform substantially the same.

Example 17

Figure 19:
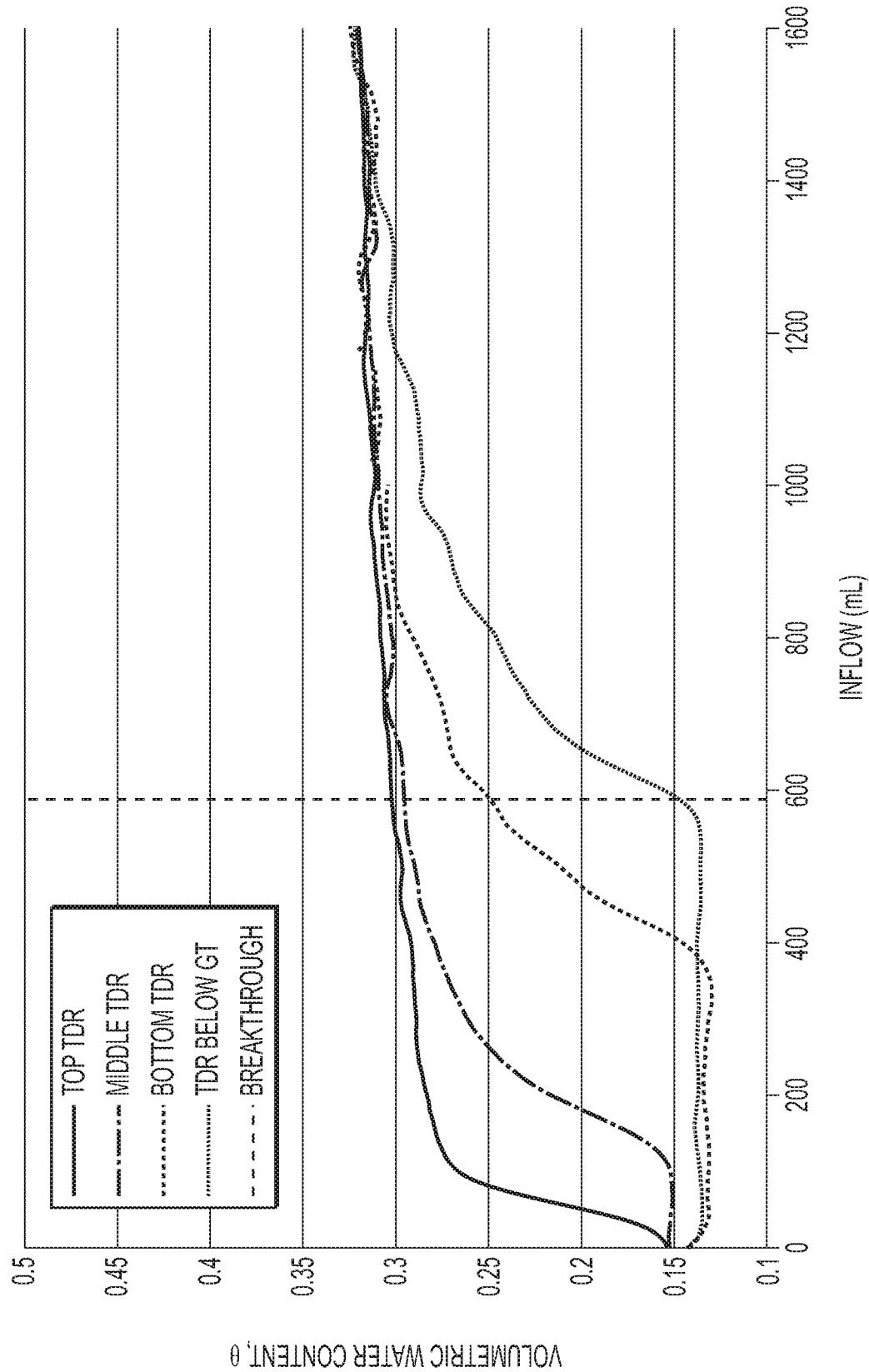
FIG. 19 is a plot illustrating volumetric moisture content versus inflow for GT27 and GT28.
Figure 20:
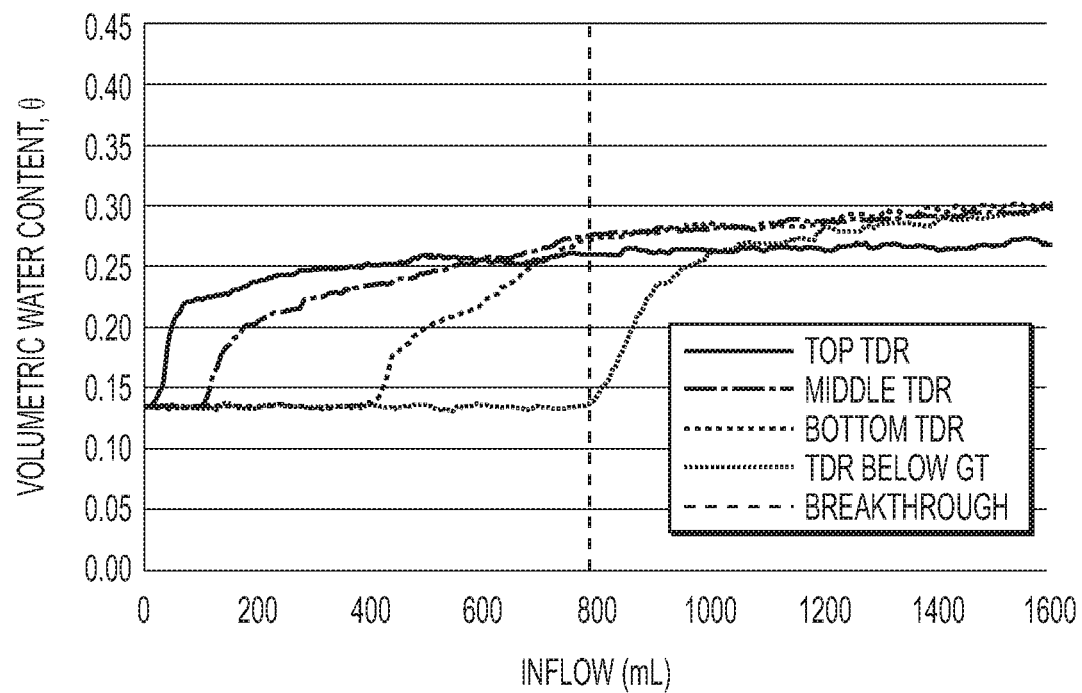
FIG. 20 is a plot illustrating volumetric moisture content versus inflow for GT2018-1.
Figure 21:
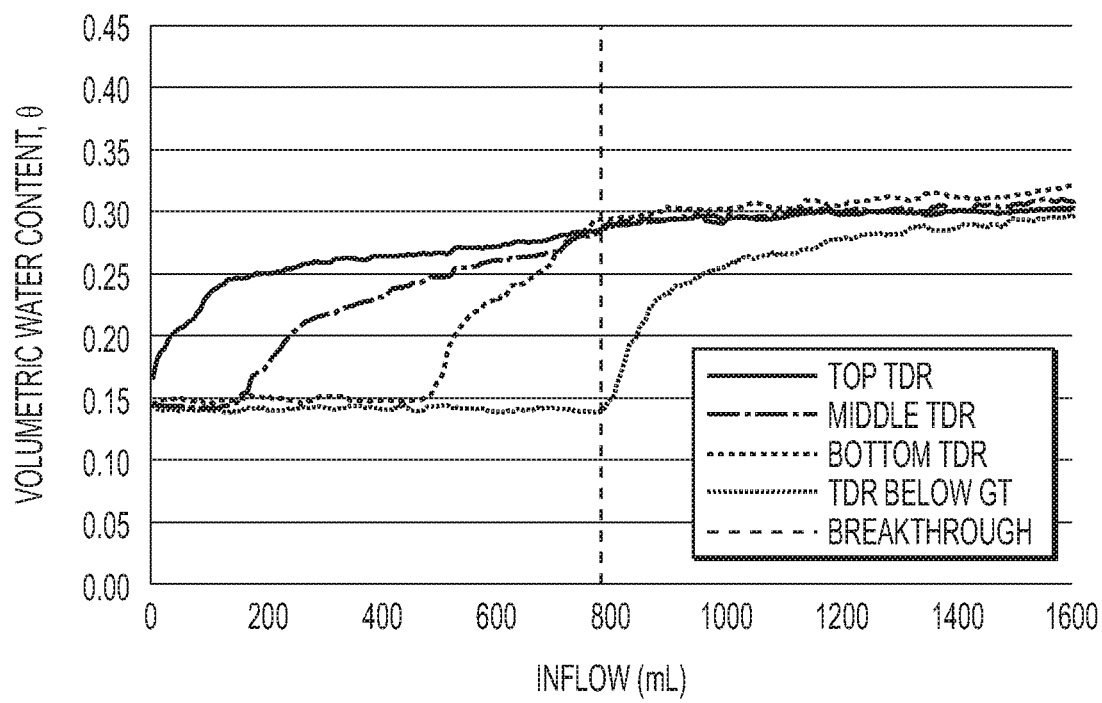
FIG. 21 is a plot illustrating volumetric moisture content versus inflow for GT2018-2.
Figure 22:
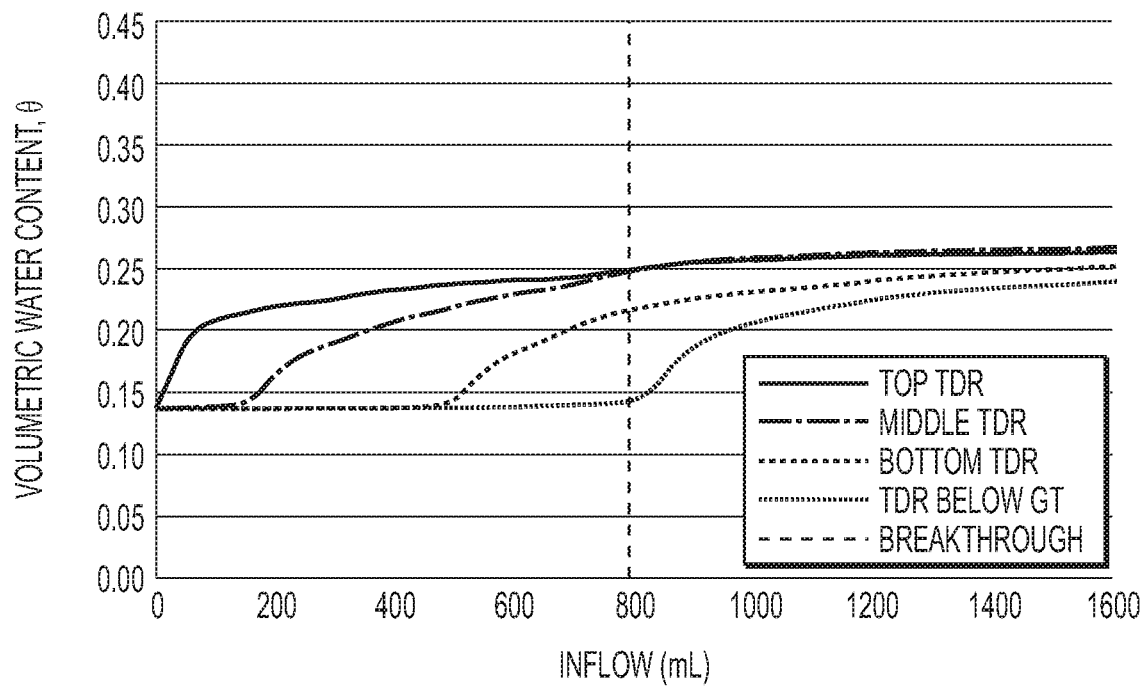
FIG. 22 is a plot illustrating volumetric moisture content versus inflow for GT2018-3.
Figure 23:
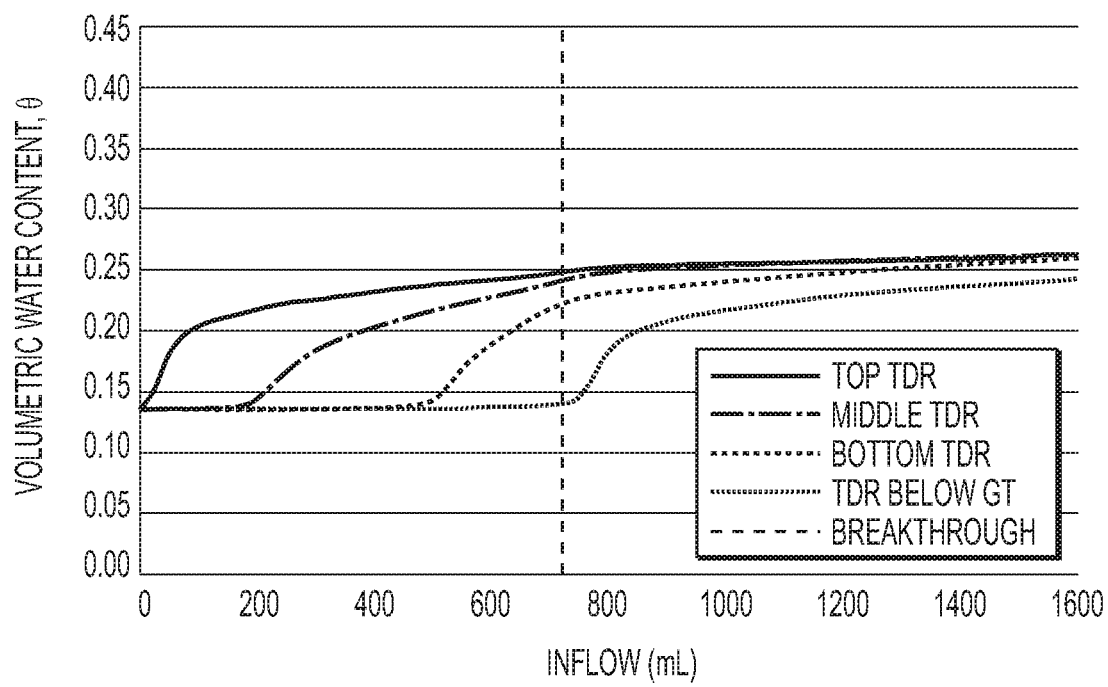
FIG. 23 is a plot illustrating volumetric moisture content versus inflow for GT2018-4.
Figure 24:
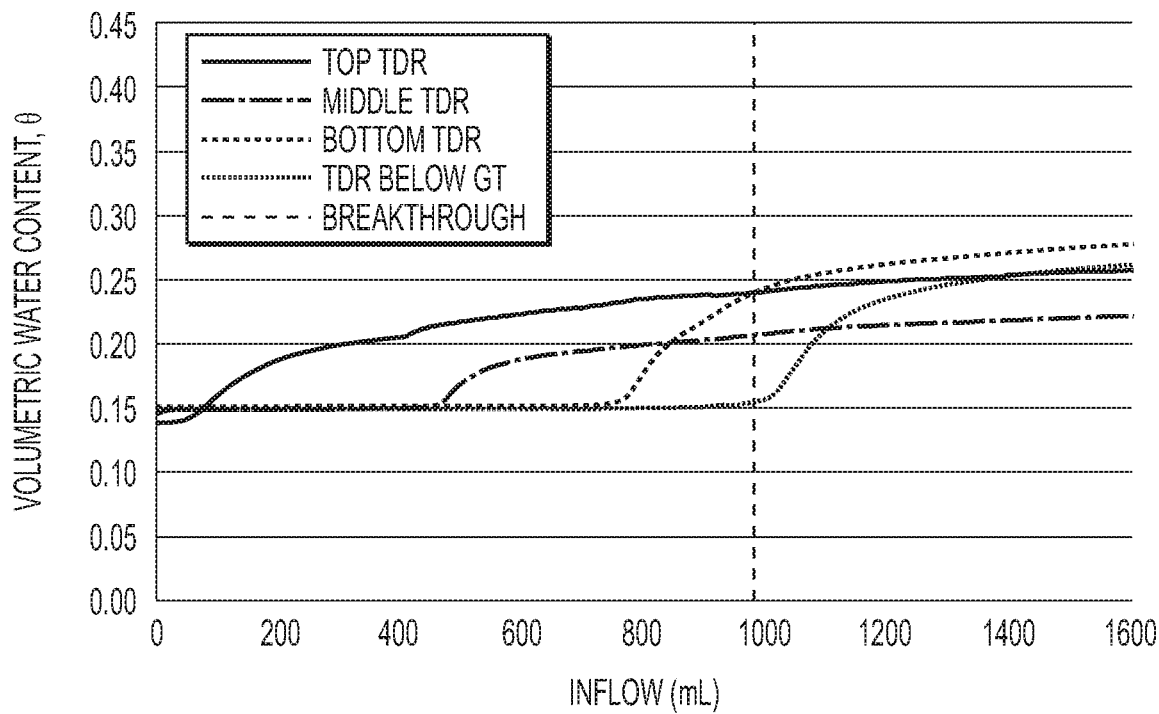
FIG. 24 is a plot illustrating volumetric moisture content versus inflow for GT2018-5.
Figure 25:
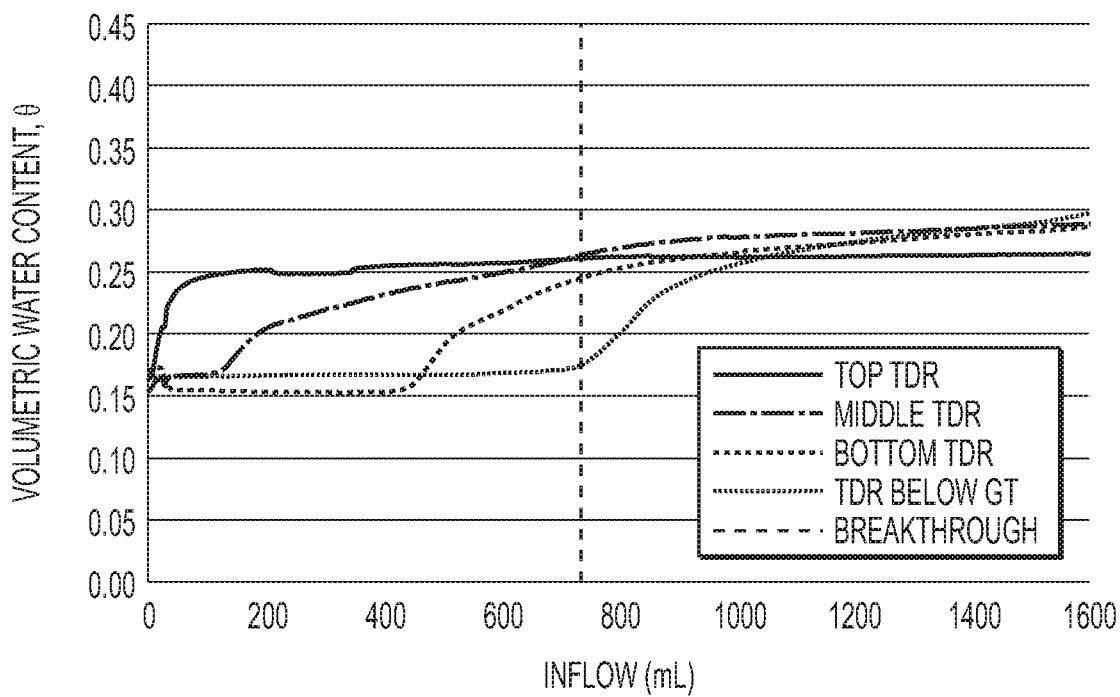
FIG. 25 is a plot illustrating volumetric moisture content versus inflow for GT2018-6.
Figure 26:
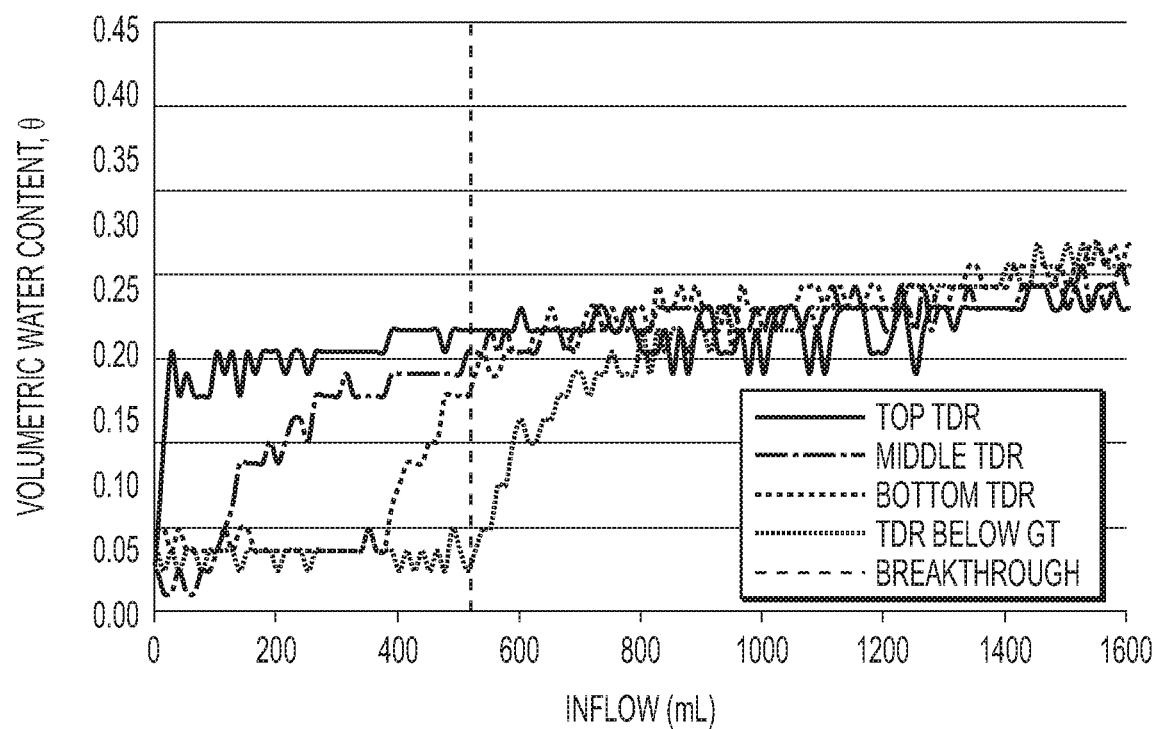
FIG. 26 is a plot illustrating volumetric moisture content versus inflow for GT8.
Figure 27:
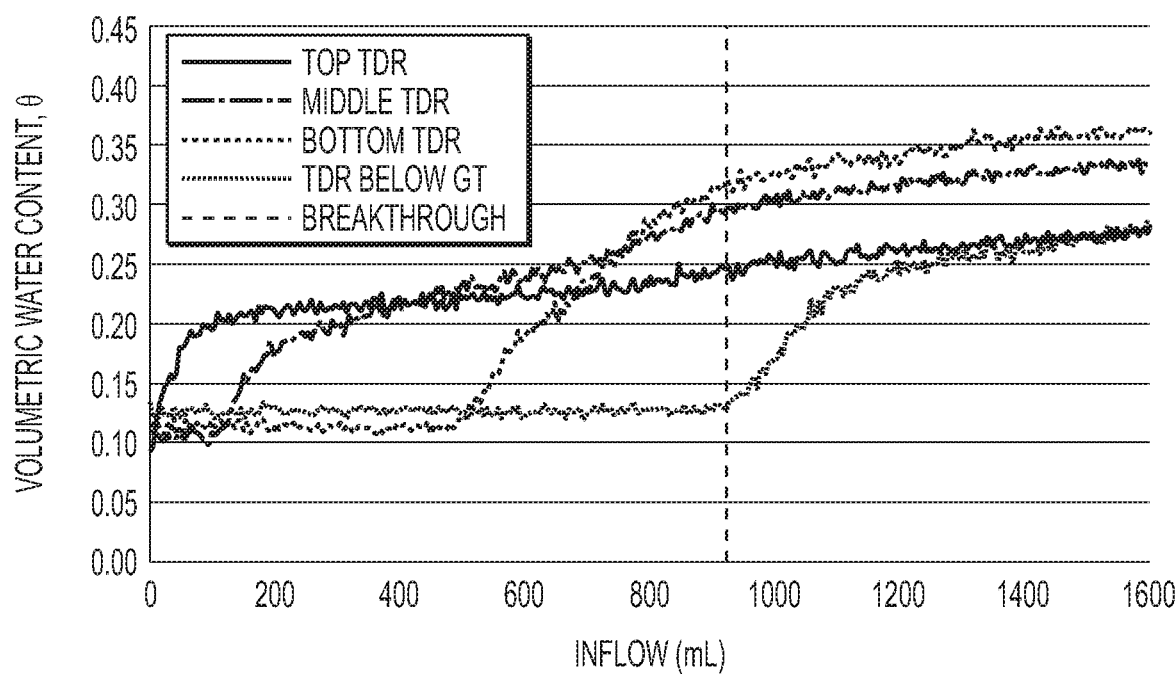
FIG. 27 is a plot illustrating volumetric moisture content versus inflow for GT5.
Figure 28:
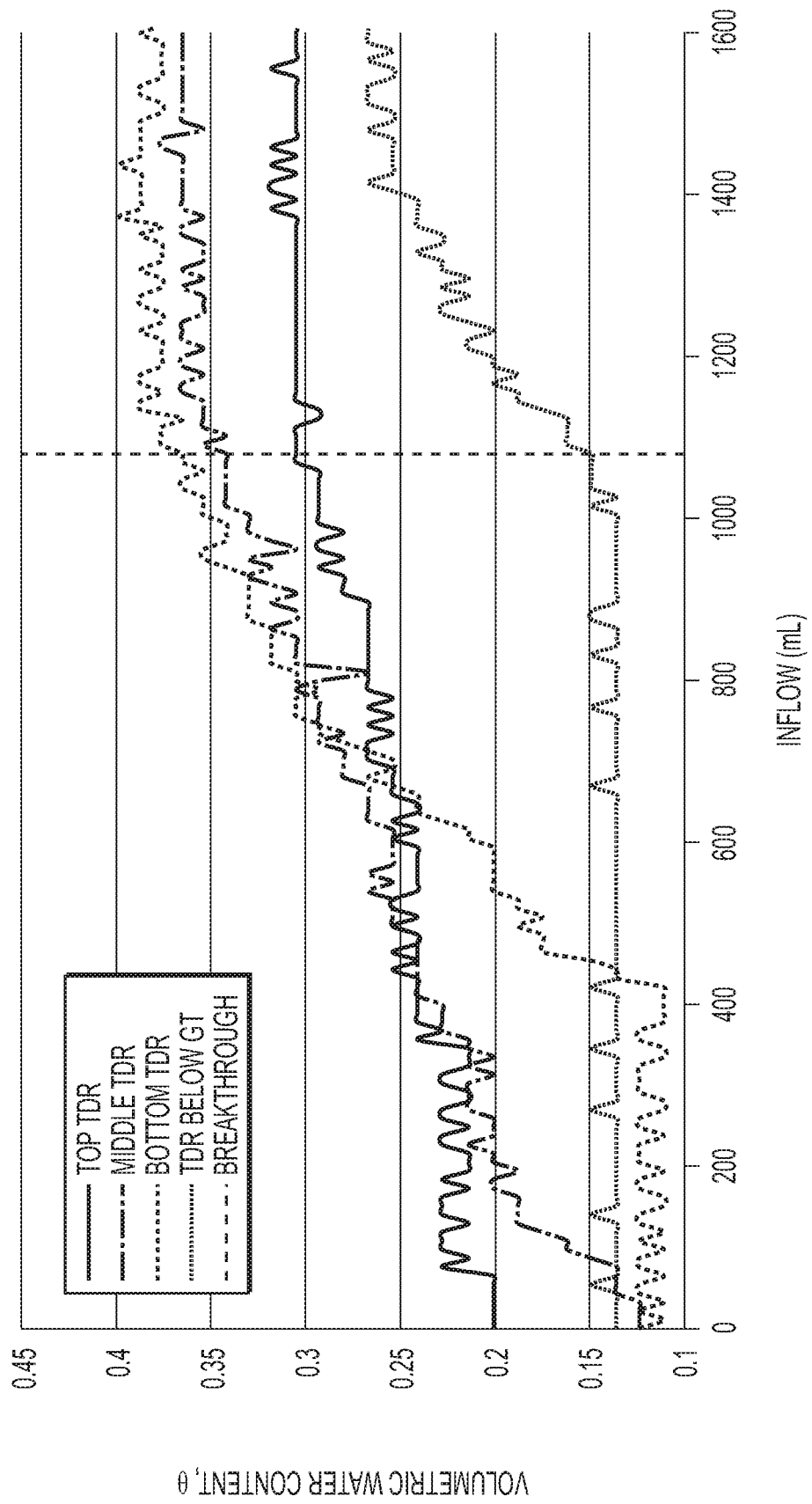
FIG. 28 is a plot illustrating volumetric moisture content versus inflow for GT2.

Geotextiles GT27 and GT28 were formed with 4DG wicking fibers tufted at a face weight of 12 osy onto the woven geotextiles to create respective composite ECPD geotextile as illustrated in FIG. 19. GT 27 was formed with a lightweight and thin woven geotextile as the drainage layer. GT28 utilized a very thin, conventional nonwoven geotextile as the drainage layer. Each test was conducted under the conditions described above for the TenCate Test. A typical column test for both of these geotextiles can be observed in FIG. 19. The face weight of the wicking fibers can be varied.

TABLE 1

| Name | Type | Class | Geotextile Description |
|---|---|---|---|
| GT1 | NW | Control | PP Mirafi 180N |
| GT2 | W | W | PP Mirafi HP570 |
| GT3 | W | W | PP Mirafi RS380i |
| GT4 | W | W | PP Mirafi RS580i |
| GT5 | W | W | 4DG Nylon Mirafi H2Ri |
| GT6 | W | W | PP Mirafi FW402 |
| GT7 | W | W | PP Mirafi FW404 |
| GT8 | W | W | PP Mirafi FW402 with 4DG nylon wicking fibers |
| GT9 | NW | B | 50/50 4DG PET/PP |
| GT10 | NW | B | 50/50 4DG PET/Hydrophilic PP |
| GT11 | NW | B | 100% 4DG PET |
| GT12 | NW | B | 50/50 4DG PET/6 DPF PET |
| GT13 | NW | B | 50/50 4DG PET/60 DPF PP |
| GT14 | NW | B | 50/50 6 DPF PET/60 DPF PP |
| GT15 | NW | B | 100% 6 DPF PET |
| GT16 | NW | C | 100% 6 DPF PET (ADI) |
| GT17 | NW | C | 100% 6 DPF PET (UI) |
| GT18 | NW | C | 100% 6 DPF PP (ADI) |
| GT19 | NW | C | 100% 6 DPF PP (UI) |
| GT20 | NW | C | 100% 4 DG PET (ADI) |
| GT21 | NW | C | 100% 4 DG PET (UI) |
| GT22 | NW | C | 100% 60 DPF PET (UI) |
| GT23 | NW | C | 50/50 4DG/60 DPF PET (UI) |
| GT24 | NW | C | 50/50 4DG/60 DPF PET (ADI) |
| GT25 | W | V | Mirafi Vertical Mirafi FW402 w/needlepunched 4DG Nylon |
| GT26 | W | V | Mirafi H2Ri w/needlepunched 4DG Nylon |
| GT27 | NW | V | 18 Pick tufted 4DG Nylon on scrim carrier |
| GT28 | NW | V | MPV tufted 4DG Nylon on 140N carrier |

NW—nonwoven
W—woven
B—blend
C—coating
PP—polypropylene
PET—polyester
DPF—denier per fiber
ADI—Albaflow PAP-01, Dicrylan PSF, and Invadine PBN
UI—Ultraphil TG and Invadine PBN

TABLE 2

| Property | Test Method | Unit | GT1 | GT2 | GT3 | GT4 | GT5 | GT6 | GT7 |
|---|---|---|---|---|---|---|---|---|---|
| Apparent Opening Size | ASTM D4751 | mm | 0.18 | 0.6 | 0.43 | 0.43 | 0.43 | 0.43 | 0.43 |
| Weight | ASTM D5261 | g/m$^2$ | 271 | 475 | 425 | 450 | 575 | 207 | 298 |
| Thickness | ASTM D5199 | mm | 1.8 | 1.25 | 1.5 | 1.5 | 1.65 | 0.7 | 0.9 |
| Transmissivity | ASTM D4491 | L/min/m$^2$ | 3870 | 1222 | 3056 | 3056 | 1194 | 5907 | 2852 |
| Permittivity | ASTM D4491 | sec$^{-1}$ | 1.1 | 0.4 | 0.9 | 1 | 0.4 | 2.1 | 0.9 |
| Cross-Plane Hyd. Cond. | — | cm/s | 0.198 | 0.05 | 0.135 | 0.15 | 0.07 | 0.14 | 0.07 |
| Porosity | — | — | 0.835 | 0.582 | 0.689 | 0.670 | 0.617 | 0.675 | 0.636 |
| Ult. Tensile Strength | ASTM D4595 | kN/m | — | 70.0 | — | — | 78.8 | 24.5 | 40.3 |

TABLE 3

| Value | Unit | GT9 | GT10 | GT11 | GT12 | GT13 | GT14 | GT15 |
|---|---|---|---|---|---|---|---|---|
| Weight | g/m$^2$ | 270 | 295 | 153 | 204 | 250 | 311 | 300 |
| Thickness | mm | 3.07 | 2.79 | 2.36 | 2.79 | 3.84 | 4.35 | 3.05 |
| Porosity | — | 0.920 | 0.904 | 0.950 | 0.944 | 0.941 | 0.935 | 0.924 |
| Permittivity | sec$^{-1}$ | 1.8 | 1.3 | 2.3 | — | — | — | — |
| Hydraulic Conductivity | cm/sec | 0.558 | 0.363 | 0.543 | — | — | — | — |

TABLE 4

| Geotextile | Volumetric Moisture Content Breakthrough | Volumetric Moisture Content Maximum | Flow Delta (mL) | Capillary Barrier Strength | Ranking |
|---|---|---|---|---|---|
| GT2 | 0.43 | 0.43 | 607 | High | 7 |
| GT4 | 0.38 | 0.41 | 490 | Med-High | 6 |
| GT3 | 0.38 | 0.40 | 380 | Medium | 5 |
| GT7 | 0.35 | 0.37 | 410 | Medium | 4 |
| GT5 | 0.31 | 0.33 | 170 | Low | 3 |
| GT6 | 0.31 | 0.33 | 190 | Low | 2 |
| GT8 | 0.25 | 0.27 | 100 | Very Low | 1 |

TABLE 5

| Geotextile | Coating | Name | Volumetric Moisture Content Breakthrough | Volumetric Moisture Content Maximum | Flow Delta (mL) |
|---|---|---|---|---|---|
| 100% 6 DPF PET | None | GT15 | 0.44 | 0.44 | 634 |
| | UI | GT17 | 0.44 | 0.44 | 754 |
| | ADI | GT16 | 0.41 | 0.42 | 680 |
| 100% 6 DPF PP | None | GT1 | 0.44 | 0.44 | 756 |
| | UI | GT19 | 0.41 | 0.41 | 596 |
| | ADI | GT18 | 0.4 | 0.4 | 580 |
| 100% 60 DPF PET | None | — | — | — | — |
| | UI | GT22 | 0.43 | 0.43 | 640 |
| | ADI | — | — | — | — |
| 50/50 4DG/6 DPF PET | None | GT22 | 0.4 | 0.42 | 550 |
| | UI | — | — | — | — |
| | ADI | — | — | — | — |
| 50/50 4DG/60 DPF PET | None | GT13 | 0.36 | 0.42 | 518 |
| | UI | GT23 | 0.32 | 0.35 | 224 |
| | ADI | GT24 | Hardened due to applied coating | | |
| 100% 4DG PET | None | GT11 | 0.37 | 0.43 | 447 |
| | UI | GT21 | 0.33 | 0.35 | 287 |
| | ADI | GT20 | 0.32 | 0.34 | 275 |

Example 18

The TenCate Test described in Example 1 was employed to determine the Flow Delta for six geosynthetic woven fabrics, GT2018-1 thru GT2018-6 (identified below in Table 7). The respective Flow Delta for the six fabrics were compared to respective Flow Delta of three commercially available fabrics from TenCate Geosynthetics Americas, MIRAFI HP570, MIRAFI FW402, and MIRAFI H2Ri.

As in Example 1, the soil used in this example was a silty clay, classified as a lean clay (CL) by the United Soil Classification System. The Atterberg limits are detailed below in Table 6. All column tests were compacted to a relative compaction of 80%, dry density of 1.47 g/cm3, and porosity of 0.46. The initial volumetric water content for all tests was 14.7% (equivalent gravimetric water content of 10.0%).

TABLE 6

| Property | LL | PL | PI | $G_s$ | $\gamma_{d, max}$ | $W_{opt}$ | $K_{sat}$ |
|---|---|---|---|---|---|---|---|
| Value | 32 | 12 | 20 | 2.71 | 1.905 g/cm3 (119 pcf) | 15% | 1.50 mL/min ($8.2 \times 10^{-5}$ cm/s) |

TABLE 7

| Name | Geotextile Description |
|---|---|
| GT2 | PP Mirafi HP570 (same as Table 1) |
| GT8 | PP Mirafi FW402 with 4DG nylon wicking fibers (same as Table 1) |
| GT2018-1 | Plain weave—alternates 1 pick (pk) of 925 denier PP monofilament (round cross-sectional shape) with 2 pks of 865 denier wicking nylon, 20 picks/inch total of both yarns |
| GT2018-2 | Plain weave—alternates 1 pk of 1600 denier PP monofilament (round cross-sectional shape) with 2 pks of 865 denier wicking nylon, 20 picks/inch total of both yarns |
| GT2018-3 | Plain weave—alternates 1 pk of 1600 denier PP monofilament (round cross-sectional shape) with 3 pks of 865 denier wicking nylon, 20 picks/inch total of both yarns |
| GT2018-4 | Plain weave—alternates 1 pk of 1600 denier PP monofilament (round cross-sectional shape) with 4 pks of 865 denier wicking nylon, 20 picks/inch total of both yarns |
| GT2018-5 | Plain weave—alternates 1 pk of 1600 denier PP monofilament (round cross-sectional shape) with 3 pks 1000 denier trilobal polyester, 20 picks/inch total of both yarns |
| GT2018-6 | Plain weave—alternates 1 pk of 1600 denier PP monofilament (round cross-sectional shape) with 4 pks 1000 denier trilobal polyester, 20 picks/inch total of both yarns |
| GT5 | 4DG Nylon Mirafi H2Ri (same as Table 1) |

The volumetric moisture content versus inflow for each sample was determined. FIGS. 20-28 are respective plots illustrating volumetric moisture content versus inflow for GT2018-1, GT2018-2, GT2018-3, GT2018-4, GT2018-5, GT2018-6, GT8, GT5, and GT2. The Flow Delta for each fabric was determined and is presented in Table 8.

TABLE 8

| Name | Volumetric Moisture Content at Breakthrough | Flow Delta (mL) |
|---|---|---|
| GT2 | 0.43 | 607 |
| GT5 | 0.33 | 380 |
| GT2018-1 | 0.28 | 380 |
| GT2018-2 | 0.29 | 315 |
| GT2018-3 | 0.23 | 312 |
| GT2018-4 | 0.23 | 264 |
| GT2018-5 | 0.25 | 212 |
| GT2018-6 | 0.25 | 292 |
| GT8 | 0.25 | 100 |

It is observed that GT2018 geotextiles perform well and have weak or substantially no capillary barriers. HP570 is a "worst case" geotextile that shows the performance of a conventional geotextile. As indicated in TABLE 8, GT2018 geotextiles not only performed better than HP570, but also better than GT5 (H2Ri) in several instances. FIGS. 20-28 lead to the following conclusions:

GT2018-1, GT2018-2, GT2018-5, and GT2018-6, respectively, form a weak a capillary barrier and overwhelms the cross-plane transmissivity, GT2018-3 and GT2018-4, respectively, do not form a capillary barrier and do not overwhelm the cross-plane transmissivity, and GT8, which is constructed with large openings and is not considered a geotextile, shows a weak capillary barrier.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An anti-capillary barrier geotextile comprising a wicking yarn,
    wherein the anti-capillary barrier geotextile is a single-layer woven geotextile comprising:
    a wicking yarn set and, optionally, a first non-wicking yarn disposed in one axis of the anti-capillary barrier geotextile; and
    a second non-wicking yarn disposed in another axis of the anti-capillary barrier geotextile and interweaving the wicking yarn set and optional first non-wicking yarn,
    wherein the wicking yarn set comprises one or more of the wicking yarn,
    wherein the anti-capillary barrier geotextile has a repeating weave pattern comprising the wicking yarn set, the optional first non-wicking yarn, and the second non-wicking yarn,
    wherein the anti-capillary barrier geotextile has a volumetric moisture content at breakthrough of less than 0.30 as determined by a TenCate Test, and
    wherein the anti-capillary barrier geotextile has a permeability between about 0.05 cm/s to about 0.15 cm/s.

2. The anti-capillary barrier geotextile as claimed in claim 1, wherein the wicking yarn set comprises two wicking yarns.

3. The anti-capillary barrier geotextile as claimed in claim 1, wherein the wicking yarn set comprises three wicking yarns.

4. The anti-capillary barrier geotextile as claimed in claim 1, wherein the anti-capillary barrier geotextile has a total surface area between about 10 square centimeters per gram and about 50 square centimeters per gram.

5. The anti-capillary barrier geotextile as claimed in claim 1, wherein the wicking yarn is between about 500 denier and about 2500 denier, and comprises a bundle of wicking fibers, the wicking fibers being multichannel, trilobal, pillow, or a combination thereof.

6. The anti-capillary barrier geotextile as claimed in claim 1, wherein the wicking yarn is between about 500 denier and about 2500 denier, and comprises a bundle of multichannel fibers.

7. The anti-capillary barrier geotextile as claimed in claim 5, wherein the bundle of multichannel fibers has between about 50 individual wicking fibers to about 1000 individual wicking fibers.

8. The anti-capillary barrier geotextile as claimed in claim 5, wherein the bundle of multichannel fibers is a twisted bundle.

9. The anti-capillary barrier geotextile as claimed in claim 5, wherein the bundle of multichannel fibers have a respective denier of between about 1 and about 100.

10. The anti-capillary barrier geotextile as claimed in claim 5, wherein the bundle of multichannel fibers has a respective denier of between about 30 and about 170.

11. The anti-capillary barrier geotextile as claimed in claim 5, wherein the bundle of multichannel fibers has a respective denier of between about 3 and about 7.

12. The anti-capillary barrier geotextile as claimed in claim 1, where in the first non-wicking yarn and second non-wicking yarn independently are a monofilament, yarn, or tape comprising polypropylene or a
    polypropylene/polypropylene copolymer blend and is between about 100 and about 10,000 denier.

13. The anti-capillary barrier geotextile as claimed in claim 1, wherein the weight of the wicking yarns is between about 0.5 ounces per square yard and about 25 ounces per square yard.

14. The anti-capillary barrier geotextile as claimed in claim 1, wherein the weight of the wicking yarns is about 1.1 ounces per square yard.

15. The anti-capillary barrier geotextile as claimed in claim 1, wherein the anti-capillary barrier geotextile comprises between 5 wicking yarns per linear inch and 50 wicking yarns per linear inch.

16. The anti-capillary barrier geotextile as claimed in claim 1, wherein the anti-capillary barrier geotextile comprises 10 wicking yarns per linear inch.

17. The anti-capillary barrier geotextile as claimed in claim 1, wherein fabric has a density in the axis containing the wicking yarn set is between about 5 yarns per linear inch and about 50 yarns per linear inch.

18. The anti-capillary barrier geotextile as claimed in claim 1, wherein the anti-capillary barrier geotextile has a density in the axis containing the second non-wicking yarn is between about 5 yarns per linear inch and about 75 yarns per linear inch.

19. The anti-capillary barrier geotextile as claimed in claim 1, wherein the anti-capillary barrier geotextile is a plain weave.

20. The anti-capillary barrier geotextile as claimed in claim 1, wherein the anti-capillary barrier geotextile is a twill weave.

21. The anti-capillary barrier geotextile as claimed in claim 1, wherein the wicking yarn is a wicking fiber, wicking monofilament, a bundle of wicking fibers, or a combination thereof.

22. The anti-capillary barrier geotextile as claimed in claim 1, wherein the anti-capillary barrier geotextile is prepared by weaving, tufting, knitting, or a combination thereof.

23. The anti-capillary barrier geotextile as claimed in claim 1, wherein the anti-capillary barrier geotextile comprises a non-wicking yarn set disposed in the warp direction, and a wicking yarn set disposed in the weft direction, the wicking yarn set comprising one or more wicking yarns.

24. The anti-capillary barrier geotextile as claimed in claim 1, wherein the anti-capillary barrier geotextile comprises a wicking yarn set disposed in the warp direction, and a non-wicking yarn set disposed in the weft direction, the wicking yarn set comprising one or more wicking yarns.

25. An anti-capillary barrier geotextile, comprising a wicking yarn inserted to create a face loop and a back loop;
wherein the anti-capillary barrier geotextile is a single-layer woven geotextile comprising:
a wicking yarn set and, optionally, a first non-wicking yarn disposed in one axis of the anti-capillary barrier geotextile; and
a second non-wicking yarn disposed in another axis of the anti-capillary barrier geotextile and interweaving the wicking yarn set and optional first non-wicking yarn,
wherein the wicking yarn set comprises one or more of the wicking yarn,
wherein the anti-capillary barrier geotextile has a repeating weave pattern comprises the wicking yarn set, the optional first non-wicking yarn, and the second non-wicking yarn,
wherein the anti-capillary barrier geotextile has a volumetric moisture content at breakthrough of less than 0.30 as determined by a TenCate Test, and
wherein the anti-capillary barrier geotextile has a permeability between about 0.05 cm/s to about 0.15 cm/s.

26. The anti-capillary barrier geotextile as claimed in claim 25, wherein the anti-capillary barrier geotextile has a tufted first wicking layer and a tufted second wicking layer.

27. The anti-capillary barrier geotextile as claimed in claim 25, wherein the anti-capillary barrier geotextile is a woven fabric.

28. The anti-capillary barrier geotextile as claimed in claim 25, wherein the anti-capillary barrier geotextile is a knitted fabric.

29. An anti-capillary barrier geotextile comprising a wicking yarn,
wherein the anti-capillary barrier geotextile is a single-layer woven geotextile comprising:
a wicking yarn set and, optionally, a first non-wicking yarn disposed in one axis of the anti-capillary barrier geotextile; and
a second non-wicking yarn disposed in another axis of the anti-capillary barrier geotextile and interweaving the wicking yarn set and optional first non-wicking yarn,
wherein the wicking yarn set comprising one or more of the wicking yarn,
wherein the anti-capillary barrier geotextile has a repeating weave pattern comprises the wicking yarn set, the optional first non-wicking yarn, and the second non-wicking yarn,
wherein the anti-capillary barrier geotextile has a Flow Delta of less than 490 milliliters as determined by a TenCate Test, and
wherein the anti-capillary barrier geotextile has a permeability between about 0.05 cm/s to about 0.15 cm/s.

30. The anti-capillary barrier geotextile as claimed in claim 29, wherein the Flow Delta is about 480 milliliters to about 100 milliliters as determined by the TenCate Test.

31. The anti-capillary barrier geotextile as claimed in claim 29, wherein the wicking yarn set comprises two wicking yarns.

32. The anti-capillary barrier geotextile as claimed in claim 31, wherein the wicking yarn set comprises three wicking yarns.

33. The anti-capillary barrier geotextile as claimed in claim 29, wherein the anti-capillary barrier geotextile has a total surface area between about 10 square centimeters per gram to about 50 square centimeters per gram.

34. The anti-capillary barrier geotextile as claimed in claim 29, wherein the wicking yarn is between about 500 denier and about 2500 denier, and comprises a bundle of wicking fibers, the wicking fibers being multichannel, trilobal, pillow, or a combination thereof.

35. The anti-capillary barrier geotextile as claimed in claim 29, wherein the wicking yarn is between about 500 denier and about 2500 denier, and comprises a bundle of multichannel fibers.

36. The anti-capillary barrier geotextile as claimed in claim 35, wherein the bundle of multichannel fibers has between about 50 individual wicking fibers to about 1000 individual wicking fibers.

37. The anti-capillary barrier geotextile as claimed in claim 35, wherein the bundle of multichannel fibers is a twisted bundle.

38. The anti-capillary barrier geotextile as claimed in claim 35, wherein the bundle of multichannel fibers has a respective denier of between about 1 and about 100.

39. The anti-capillary barrier geotextile as claimed in claim 35, wherein the bundle of multichannel fibers has a respective denier of between about 30 and about 170.

40. The anti-capillary barrier geotextile as claimed in claim 35, wherein the bundle of multichannel fibers has a respective denier of between about 3 and about 7.

41. The anti-capillary barrier geotextile as claimed in claim 29, where in the first non-wicking yarn and second non-wicking yarn independently are a monofilament, yarn, or tape comprising polypropylene or a polypropylene/polypropylene copolymer blend, and is between about 100 denier to about 10,000 denier.

42. The anti-capillary barrier geotextile as claimed in claim 29, wherein the weight of the wicking yarns is between about 0.5 ounces per square yard (osy) and about 25 ounces per square yard.

43. The anti-capillary barrier geotextile as claimed in claim 29, wherein the weight of the wicking yarns is about 1.1 ounces per square yard.

44. The anti-capillary barrier geotextile as claimed in claim 29, wherein the anti-capillary barrier geotextile comprises between 5 wicking yarns per linear inch and 50 wicking yarns per linear inch.

45. The anti-capillary barrier geotextile as claimed in claim 29, wherein the anti-capillary barrier geotextile comprises 10 wicking yarns per linear inch.

46. The anti-capillary barrier geotextile as claimed in claim 29, wherein fabric has a density in the axis containing the wicking yarn set is between about 5 yarns per linear inch and about 50 yarns per linear inch.

47. The anti-capillary barrier geotextile as claimed in claim 29, wherein the anti-capillary barrier geotextile has a density in the axis containing the second non-wicking yarn is between about 5 yarns per linear inch and about 75 yarns per linear inch.

48. The anti-capillary barrier geotextile as claimed in claim 29, wherein the anti-capillary barrier geotextile is a plain weave.

49. The anti-capillary barrier geotextile as claimed in claim 29, wherein the anti-capillary barrier geotextile is a twill weave.

50. The anti-capillary barrier geotextile as claimed in claim 29, wherein the wicking yarn is a wicking fiber, wicking monofilament, a bundle of wicking monofilaments, or a combination thereof.

51. The anti-capillary barrier geotextile as claimed in claim 29, wherein the anti-capillary barrier geotextile is prepared by weaving, tufting, knitting, or a combination thereof.

52. The anti-capillary barrier geotextile as claimed in claim 29, wherein the anti-capillary barrier geotextile is used with a civil structure.

53. The anti-capillary barrier geotextile as claimed in claim 52, wherein the civil structure is a road, an embankment, or a wall.

* * * * *